(12) United States Patent
Ogawa et al.

(10) Patent No.: US 10,221,047 B2
(45) Date of Patent: Mar. 5, 2019

(54) DISPLAY DEVICE OF EQUIPMENT AND EQUIPMENT PROVIDED WITH DISPLAY DEVICE

(71) Applicant: GOGOH CO., LTD., Aichi (JP)

(72) Inventors: Kouji Ogawa, Aichi (JP); Fujioki Yamaguchi, Aichi (JP)

(73) Assignee: Gogoh Co., Ltd., Aichi (JP)

( * ) Notice: Subject to any disclaimer, the term of this patent is extended or adjusted under 35 U.S.C. 154(b) by 0 days.

(21) Appl. No.: 13/805,588

(22) PCT Filed: Dec. 11, 2012

(86) PCT No.: PCT/JP2012/082086
§ 371 (c)(1),
(2) Date: Dec. 19, 2012

(87) PCT Pub. No.: WO2013/114737
PCT Pub. Date: Aug. 8, 2013

(65) Prior Publication Data
US 2014/0054254 A1 Feb. 27, 2014

(30) Foreign Application Priority Data
Jan. 31, 2012 (JP) .................. 2012-018669

(51) Int. Cl.
*B60Q 1/34* (2006.01)
*B66C 15/06* (2006.01)
*B66C 13/40* (2006.01)

(52) U.S. Cl.
CPC ............ *B66C 15/065* (2013.01); *B66C 13/40* (2013.01); *B60Q 1/34* (2013.01)

(58) Field of Classification Search
CPC ...... B66C 15/045; B66C 15/065; B66C 13/40; E01F 9/0126; B60Q 1/34; B60Q 1/36
(Continued)

(56) References Cited

U.S. PATENT DOCUMENTS 3,631,619 A * 1/1972 Campbell ................. 40/564
4,516,117 A * 5/1985 Couture et al. .......... 340/685
(Continued)

FOREIGN PATENT DOCUMENTS

CN 101687608 A 3/2010
EP 2181955 A1 5/2010
(Continued)

OTHER PUBLICATIONS

English translation of JP 2010-254417.*
(Continued)

*Primary Examiner* — Sang K Kim
*Assistant Examiner* — Nathaniel L Adams
(74) *Attorney, Agent, or Firm* — Mai-Tram D. Lauer; Westman, Champlin & Koehler, P.A.

(57) ABSTRACT

Equipment provided with a display device, the equipment including a mechanism that includes a movable portion, an operating device that operates movement of the movable portion, a moving mechanism that moves the movable portion, the display device that makes a display about movement of the movable portion, and a drive control unit that, based on the operation by the operating device, controls operation of the moving mechanism and the display of the display device. The display device is configured to make a display about movement of the movable portion prior to start of the movement of the movable portion.

2 Claims, 22 Drawing Sheets

(58) Field of Classification Search
USPC .......... 212/278, 280, 329, 284, 276; 40/204, 40/590, 591, 592, 612
See application file for complete search history.

(56) References Cited

U.S. PATENT DOCUMENTS

| | | | | |
|---|---|---|---|---|
| 4,928,101 | A * | 5/1990 | Favors | 340/943 |
| 5,019,798 | A * | 5/1991 | Pherigo, Jr. | 340/326 |
| 6,102,373 | A * | 8/2000 | Amsinger | 256/1 |
| 6,208,260 | B1 * | 3/2001 | West et al. | 340/691.3 |
| 6,405,114 | B1 * | 6/2002 | Priestley et al. | 701/50 |
| 6,744,372 | B1 * | 6/2004 | Shaw et al. | 340/685 |
| 6,894,621 | B2 * | 5/2005 | Shaw | 340/685 |
| 6,954,150 | B2 * | 10/2005 | Nishimura | E02F 3/962 340/665 |
| 7,102,623 | B2 * | 9/2006 | Morath | B66C 13/16 345/172 |
| 7,167,082 | B2 * | 1/2007 | Stigall | 340/407.1 |
| 7,194,358 | B2 * | 3/2007 | Callaghan et al. | 701/301 |
| 8,618,949 | B2 * | 12/2013 | Maynard et al. | 340/685 |
| 8,707,595 | B2 * | 4/2014 | Beemsterboer et al. | 40/515 |
| 2003/0164349 | A1 * | 9/2003 | Kohlenberg | 212/284 |
| 2012/0132605 | A1 * | 5/2012 | Ogawa et al. | 212/284 |
| 2013/0105430 | A1 * | 5/2013 | Ogawa et al. | 212/282 |

FOREIGN PATENT DOCUMENTS

| | | |
|---|---|---|
| JP | S4626735 Y | 9/1971 |
| JP | H01303279 A | 12/1989 |
| JP | H0948586 A | 2/1997 |
| JP | 2004075284 | 3/2004 |
| JP | 201095361 A | 4/2010 |
| JP | 2010254417 A | 11/2010 |

OTHER PUBLICATIONS

International Search Report dated Mar. 19, 2013 for corresponding International Application No. PCT/JP2012/082086, filed Dec. 11, 2012.

International Preliminary Report on Patentability dated Aug. 14, 2014 for corresponding International Application No. PCT/JP2012/082086, filed Dec. 11, 2012.

Office Action, dated May 26, 2015, for corresponding Chinese Application No. 201280001755.2, and English translation (20 pages).

Office Action issued in corresponding Chinese Patent Application No. 2012-80001755.2 dated Apr. 12, 2016.

Chinese Office Action and English translation dated Nov. 25, 2016 for Chinese Patent Application No. 201280001755.2.

Notice of Reasons for Rejection and English Translation dated Sep. 20, 2016 for Corresponding Japanese Patent Application No. 2012557344.

Japanese Notice of Reasons for Rejection and English Translation dated Apr. 4, 2017 for Japanese Patent Application No. 2012-557344.

* cited by examiner

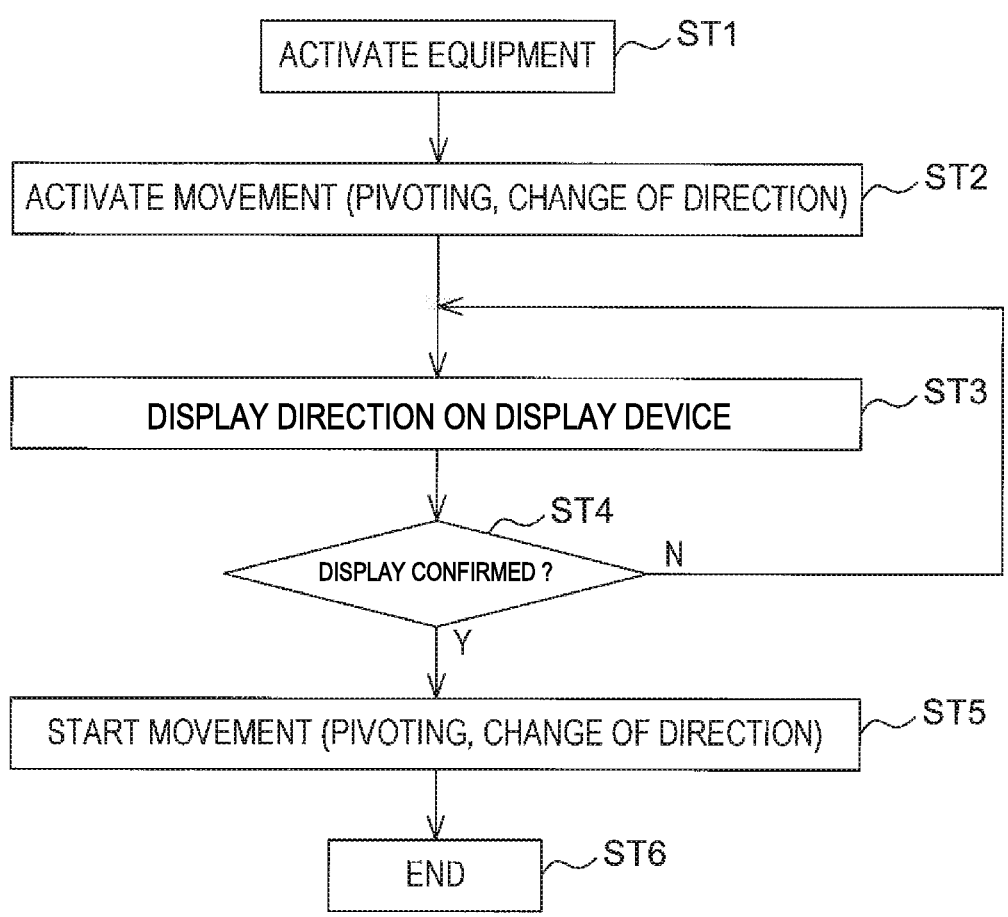

STOP    STOP    LOW SPEED    HIGH SPEED    CRANE OPERATION

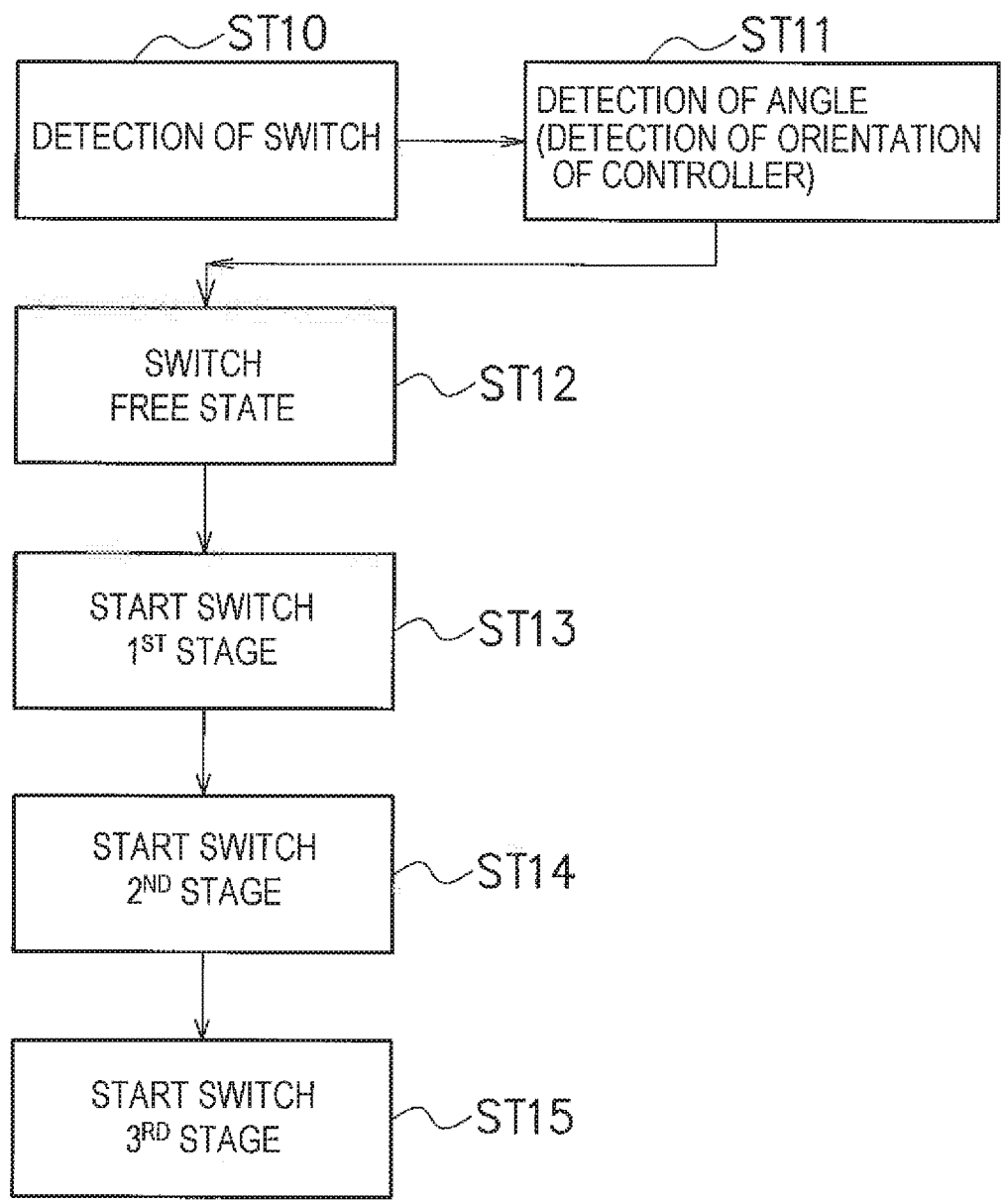

LEFT TURN

RIGHT TURN

LATERAL MOVEMENT

LATERAL MOVEMENT

DESCENT OF SUSPENDED LOAD

ASCENT OF SUSPENDED LOAD

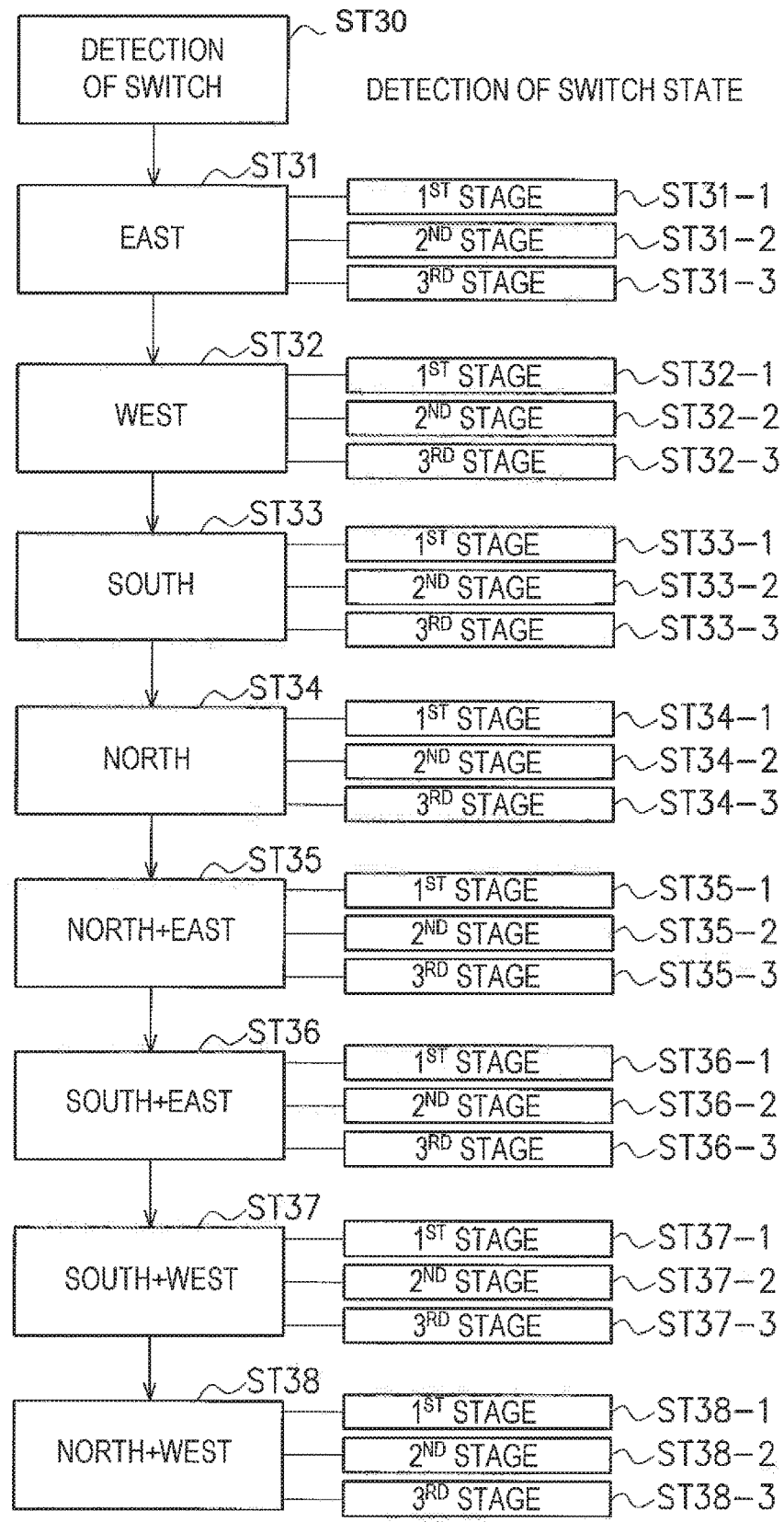

FIG.17A
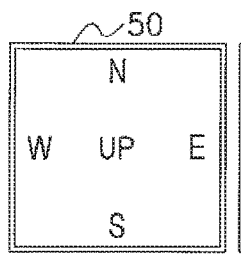 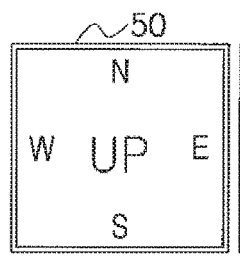 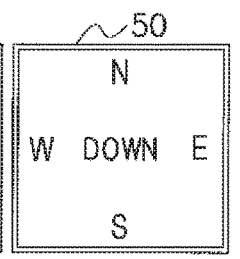 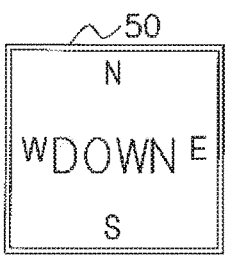
FIG.17B
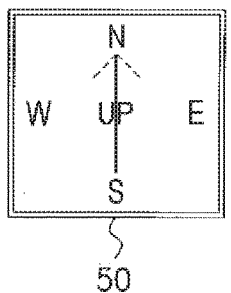 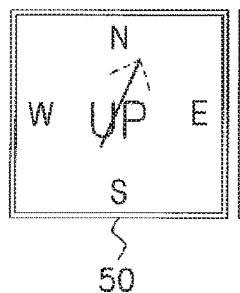 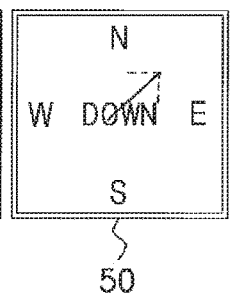 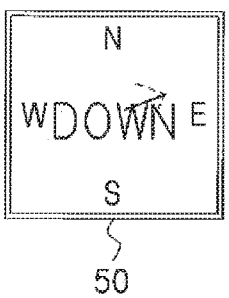
FIG.18
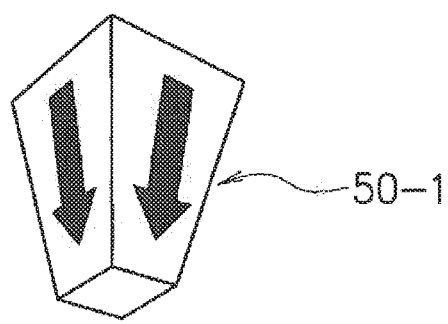

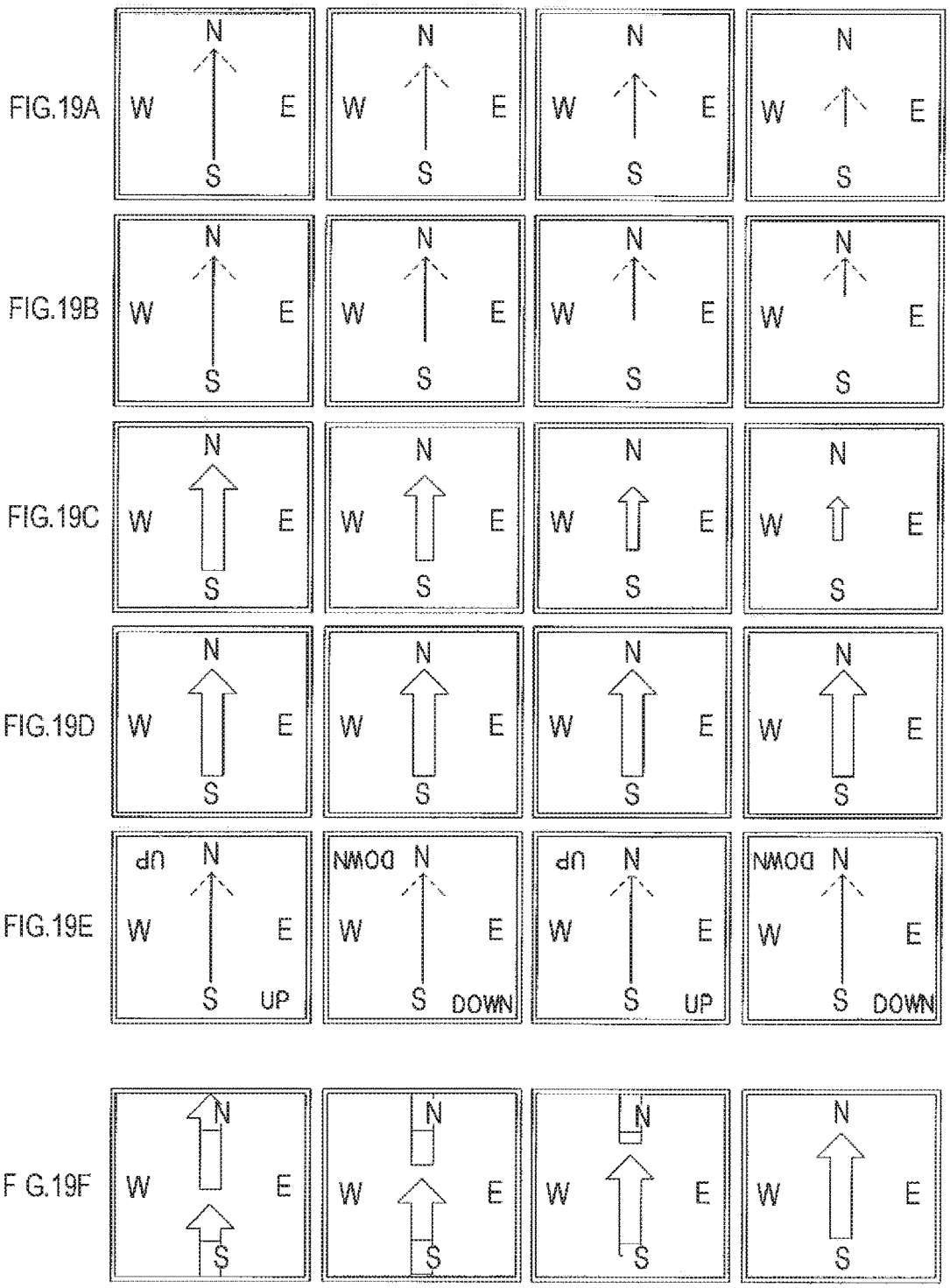

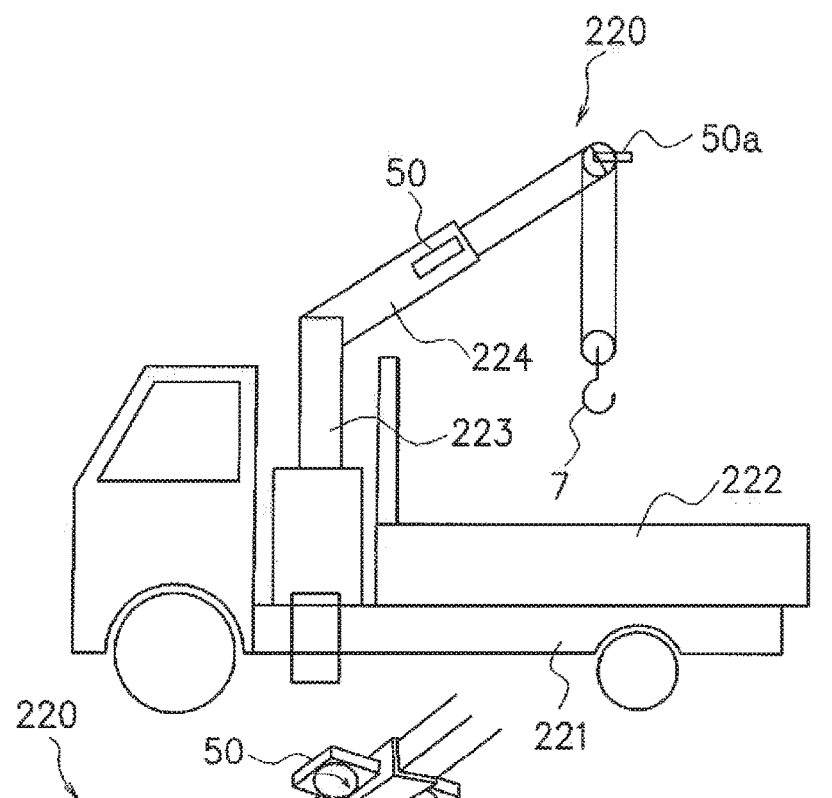
FIG.20A
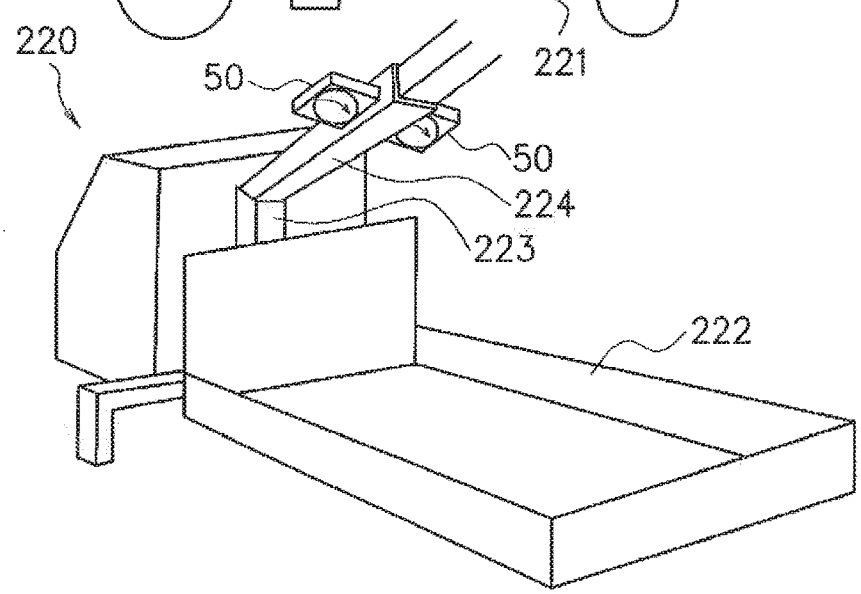
FIG.20B
FIG.21
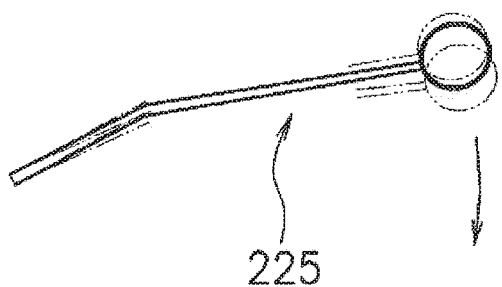

DISPLAY DEVICE OF EQUIPMENT AND EQUIPMENT PROVIDED WITH DISPLAY DEVICE

CROSS-REFERENCE TO RELATED APPLICATION

This application is a Section 371 National Stage Application of International Application No. PCT/JP2012/082086, filed Dec. 11, 2012, which claims the benefit of Japanese Patent Application No. 2012-018669 filed Jan. 31, 2012 in the Japan Patent Office, and there entire disclosure of each of which is incorporated herein by reference.

TECHNICAL FIELD

The present invention relates to a display device provided in cranes such as overhead cranes, vehicle-mounted cranes and jib cranes, and various work equipment and self-propelled equipment (equipment substantially in the category of "industrial equipment") such as transfer robots equipped with a transfer arm for mounting or holding an article, vehicles for work at height (including self-propelled vehicles for work at height) and autonomous robots which change the direction of travel and speed. In particular, the present invention relates to a display device for displaying a direction of movement of an arm of cranes and a work arm of robots, and a direction of travel of equipment itself.

In the present invention, terms below are defined or interpreted as follows.

(1) "Operating device" is not limited to those attached to target equipment for operation to control operation of the equipment, and also includes those having a meaning of remote controllers which are located away from the equipment and perform remote operation and remote control, and others (hereinafter, referred to as "operating device"). In the operating device of operating device equipment, difference in signal transmission method, such as between radio and wired, do not affect the interpretation or the definition of the operating device, unless otherwise described.

(2) A term "moving body" is also represented as "movable portion" in the following, which is a member or a component moved relative to a two-dimensional or three-dimensional direction by a moving device which moves two-dimensionally (on a virtual plane of X and Y) or three-dimensionally (on axes X, Y, and Z). For example, the "moving body" has a holding mechanism or a hook or the like for hanging, and refers to those which travel along rails or arm-like members which pivot.

In a case of an autonomous robot, its autonomously moving body is the "moving body".

(3) "Moving mechanism" is a mechanism for moving the moving body, and includes a prime mover of a lift. If the moving body is moved in a three-dimensional direction, an X-axis motor, a Y-axis motor and a Z-axis motor which enable the movement correspond to "moving mechanisms" or "parts of a moving mechanism".

BACKGROUND ART

An overhead crane installed on a ceiling of a factory or the like, as a kind of equipment according to the present invention, is configured such that a girder with a laterally movable hoist is laid between a pair of saddles traveling with wheels on a traveling rail which is laid parallel in a vicinity of a ceiling of a building, for example, as shown in Patent Document 1.

PRIOR ART DOCUMENTS

Patent Documents

Patent Document 1: Japanese Unexamined Patent Application Publication No. 2004-75284

SUMMARY OF THE INVENTION

Problems to be Solved by the Invention

In a case of an overhead crane or the like used in particular in a coating factory or others, regardless of whether or not an operating device is of wired or radio type, there has been a danger that a conveyed material retained in a hanging manner on a traveling body which is the moving body that moves on a traveling rail may hit a worker other than the operator and cause a major accident.

This type of accident is not limited to overhead cranes, self-propelled cranes, or self-supporting cranes. Even when equipment such as an autonomous robot, other than those which convey a conveyed material, without an operator is moving autonomously inside a factory or indoor, there may be a danger that the robot impinges on a human.

Thus, for example, in overhead cranes, there is a method of installing at an open site which can be viewed from the work site a display unit that displays a current traveling direction of a traveling body which travels on a traveling rail.

However, of course, it is unknown at what timing workers who are in a dangerous place view what is displayed on the display unit which is showing the traveling direction when the traveling body is traveling. For this reason, there may be cases where only showing the traveling direction during the travel of the traveling body does not provide enough time to avoid danger, and an accident occurs.

In one aspect of the present invention, it is desirable that a display device of equipment is provided which enables people other than the operator to safely know the movement of the equipment related to transport and conveyance, and to avoid danger.

Means for Solving the Problems

Equipment provided with a display device according to one aspect of the present invention includes a mechanism that is constituted of at least any one of or more of a movable portion that autonomously moves, pivots or travels, a movable portion that moves, pivots or travels under operation control, and a lift, an operating device that commands an operation of any one of the mechanisms, and a drive control unit that, based on the command from the operating device, commands each drive unit to perform any one of the operations, and commands the display device to make a required display. The display device is configured to display information about the operation prior to start of the operation along an at least commanded operating direction or an autonomously determined operating direction, regarding the moving and pivoting or traveling operation. To summarize, the equipment provided with a display device of the present invention includes a mechanism that includes a movable portion, an operating device that operates movement of the movable portion, a moving mechanism that moves the movable portion, the display device that makes a display about movement of the movable portion, and a drive control unit that, based on the operation by the operating device, controls operation of the moving mechanism and the display of the display device. The display device is configured to make a display about movement of the movable portion prior to start of the movement of the movable portion.

According to the above configuration, a person around the equipment can learn the motion of the equipment before the equipment starts moving. Thus, it is possible for the person to escape to a safe location or field before the operation of the equipment starts.

Here, the display device may be provided in all equipment and structures (mechanisms) which, due to its movement, people around the equipment and structures can be possibly exposed to danger.

The "movable portion that autonomously moves, pivots or travels" herein refers to various moving parts such as, for example, a traveling body that moves and travels along an XY rail in overhead cranes or the like, a hoisting machine as a lift provided at a pillar erected in an inclined manner for use in a construction site or the like, a crusher to crush a target structure by shear stress of a cutter at a tip of an arm, etc. These, if provided with a command for operation through the operating device, may continue working without any commands on each step due to preinstalled operation programs and sequence circuits, and work autonomously. The "movable portion" includes the traveling body (of overhead cranes and free-standing cranes, etc.), the arm (that pivots at an upper structure of the cranes), a lift attached to the arm, and so on. The "movable portion" also includes a transfer robot programmed to carry assemblies and travel autonomously in factories for delivery. The robot, for example, in a working environment, may also alter its destination during traveling. Thus, by providing a display device that displays a direction of the altered course before the alternation, safety of workers who work together in the working environment can be promoted.

The "movable portion that moves, pivots or travels under operation control, and a lift" are also operated in the same equipment as described above, that is, overhead cranes and self-propelled cranes, etc. However, the equipment may be operated by a driver at a driver's seat who manually operates an operating device, or by remote control such as radio (including optical communication) control via an operating device from a remote location.

The display device displays information about the operation first of all. The information about the operation also includes information about an operation direction of the movable portion or the like and information about other than the operation direction.

Preferably, the display device may be arranged to occupy a size and position to be visible from outside at least to a person other than an operator of the equipment, and the drive control unit may be configured to command the moving mechanism to start the movement of the movable portion after confirming that the display device has made a display about the movement of the movable portion.

According to the above configuration, arrangement to occupy the size and position to be visible from outside at least to the person other than the operator ensures visual recognition by the person other than the operator. Moreover, since the display device first makes the display on the operating direction and the operation is started after the display is confirmed, safety can be more reliably secured.

Here, it is necessary that the "display device" is visible to "at least a person other than the operator". The display device may be visible also to the operator himself/herself. Rather, it is desirable that the display device can be viewed by both the operator and other workers at the same time.

Thus, if a person operating the equipment is a beginner, such display device is useful because the operator can perform operation of his/her own while checking the display device.

In addition, it is also possible not to make the actual moving operation proceed until the display device makes a display on the operating direction for a predetermined period of time electrically using a timer or the like, or by using a function such as a mechanical stopper.

Preferably, an operation element such as a switch, a lever, a knob portion or a handle, etc. may be attached as the operating device for performing the operation control, a plurality of movable stages may be provided in a movable range of the operation element, in accordance with command stages to move the movable portion, and, at a stage before the operation element enters a command stage to start the movement of the movable portion, the display device may be configured to make a display about at least a direction of movement of the movable portion.

According to the above configuration, when the operator using the operation element tries to give a command to start the movement of the movable portion, the direction in which the movable portion intends to move is indicated reliably by the display device prior to the command to start the movement.

As a switching unit, a contact unit by electrical contacts, a mechanical unit, a touch sensor and a pressure sensor, etc. can be used.

Preferably, the display device may be fixed to the movable portion or the mechanism.

Thereby, regardless of indoor and outdoor, when a plurality of equipments are installed in an adjacent work area (in a work building), or when there are more than one movable portion or the like in a single equipment, it becomes clear about which of the movable portions of which equipment the particular display device which has reached eyes of the worker, etc. is doing the display. In other words, false recognition or the like of the moving direction can be effectively prevented for each movable portion. Thereby, safety can be further enhanced.

Preferably, the display device may be configured to change a display mode depending on contents of the operation by the operating device.

According to the above configuration, for example, when a push button is selected as a configuration example of the operation element of the operating device, changing a type of symbols shown in the display device in accordance with an amount of pushing the button can help visual intuitive understanding.

Preferably, the display device is configured to display the contents of the operation by the operating device by an arrow, and the arrow is configured to appear that its size or color changes in accordance with a speed of the movement of the movable portion commanded according to the operation by the operating device.

According to the above configuration, degree of danger or the like in accordance with the moving speed of the movable portion and the like can be grasped intuitively from the color display shown by the display device.

Preferably, the display device may be configured to display contents of the movement of the movable portion commanded according to the operation by the operating device by an arrow, and the arrow may be configured to appear to move along the direction of movement of the movable portion.

According to the above configuration, it is possible to grasp intuitively the direction of movement of the movable portion or the like by the movement of the arrow in the display device.

Preferably, the display device may be configured to display the contents of the operation by the operating device by an arrow, and to display not only the direction of movement of the movable portion but also a direction of up and down movements of the movable portion or a material to be conveyed by the movable portion.

According to the above configuration, the display of the direction of movement of the movable portion or the like can be three-dimensionally displayed, more specifically, for example, together with directions upward, downward, etc.

Preferably, the display device may be configured to display the contents of the operation by the operating device by an arrow, and the arrow may be configured to appear to change its length along the direction of movement of the movable portion.

According to the above configuration, a degree of danger in accordance with the moving speed of the movable portion the display of the direction of movement of the movable portion, a moving duration and the like can be grasped intuitively from the length of the arrow shown by the display device Further, a display device according to another aspect of the present invention is provided in equipment that includes a mechanism that is constituted of at least any one of or more of a movable portion that autonomously moves, pivots or travels, a movable portion that moves, pivots or travels under operation control, or a portion that moves, pivots or travels a body itself autonomously or under operation control, an operating device that commands operation of any one of the mechanisms, and a drive control unit that, based on the command from the operating device, commands a drive unit to perform any one of the operations. The drive control unit is configured, when there is a command for any one of the operations by the operating device, to display an at least commanded operating direction or an autonomously determined operating direction, regarding the moving and pivoting or traveling operation, prior to start of the operation along the operating direction. To summarize, the display device of the present invention is provided in equipment that includes a mechanism that includes a movable portion, an operating device that operates movement of the movable portion, a moving mechanism that moves the movable portion, and a drive control unit that, based on the operation by the operating device, controls operation of the moving mechanism. The display device is configured to make a display about movement of the movable portion prior to start of the movement of the movable portion.

Such display device can be implemented by the drive control unit that is configured to control a display of the display device in accordance with the operation by the operating device.

Effect of the Invention

According to the present invention, it is possible to provide a display device of equipment which allows people other than the operator to safely know the operation of the equipment concerning movement, conveyance and others to avoid risk.

BRIEF DESCRIPTION OF THE DRAWINGS

FIG. 5 is a flow diagram for explaining a principle of display in a display device.

FIG. 8 is a flow diagram showing a relationship between the switch and display when the display device is applied to an XY crane.

FIG. 15 is a flow diagram showing a relationship between the switch and display when the display device is provided in an equipment that performs operation toward east, west, south and north directions and moves up and down.

FIGS. 17A-17B are views respectively showing a display example of the display device of an equipment that performs operation toward east, west, south and north directions and moves up and down.

FIG. 18 is a schematic perspective view showing a configuration example in a case where the display device of the equipment is configured three-dimensionally.

FIGS. 19A-19F are drawings that respectively illustrates various display modes of the display device.

FIGS. 20A-20B are explanatory diagrams respectively showing an example in which an (operating) equipment with a display device is combined with a vehicle.

FIG. 21 is an explanatory diagram showing a configuration example of an operation element of the equipment of FIG. 20.

EXPLANATION OF REFERENCE NUMERALS

1 . . . overhead crane, 5 . . . traveling body (movable portion), 7 . . . hook, 10 . . . operating device, 11 . . . switch (operation element), 20 . . . first housing, 30 . . . second housing, 40 . . . drive control device, 45 . . . moving mechanism, 50 . . . display device

MODE FOR CARRYING OUT THE INVENTION

Hereinafter, embodiments of the present invention will be described in detail with reference to drawings.

It should be noted that the embodiments described below are merely examples of the preferred embodiment according to the present invention. Unless otherwise stated below, the scope of the present invention is not limited to the described embodiments.

Figure 1:
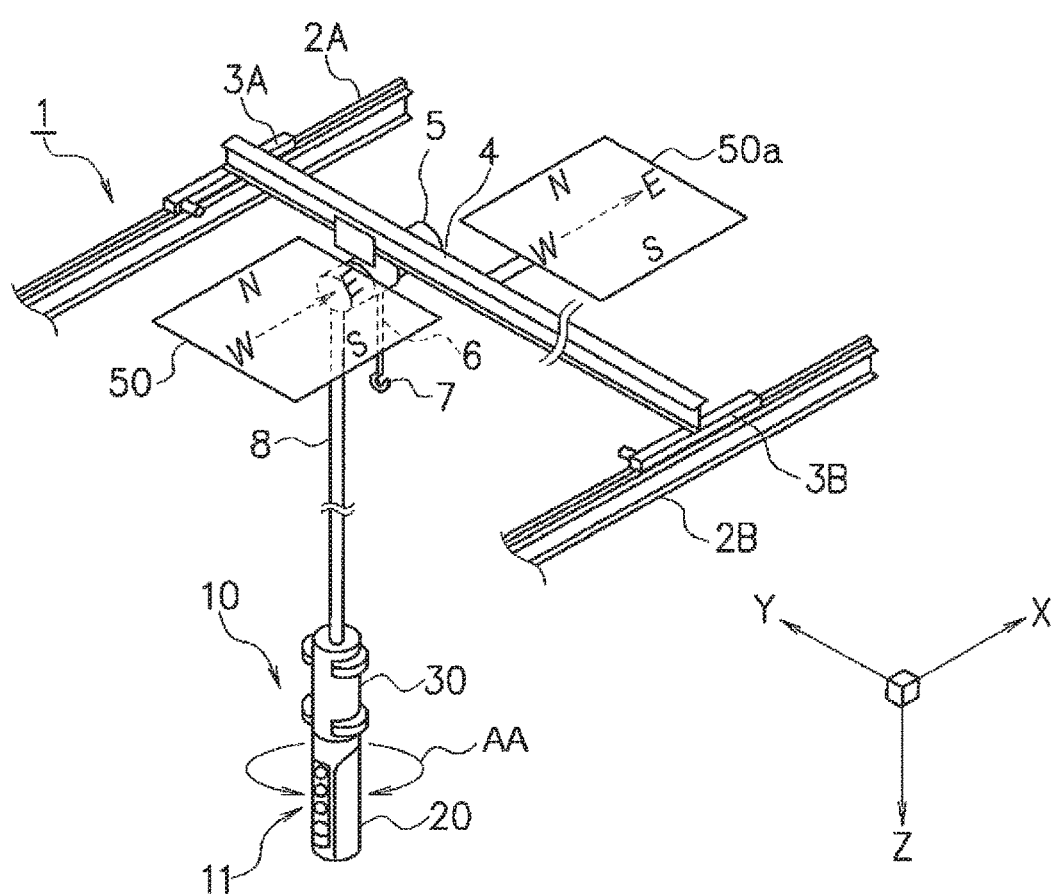
FIG. 1 is a schematic perspective view of an overhead crane as an example of an embodiment of the present invention.

FIG. 1 is a perspective view showing an overall configuration of an overhead crane serving as a three-dimensional moving apparatus according to an embodiment of the present invention.

Here, the overhead crane which is the three-dimensional apparatus is described as an example of "equipment" of the present invention. As described below, there are various examples of the "equipment" of the present invention. However, it is particularly useful if the present invention is applied to an overhead crane (including those used outdoors). The "overhead crane" as used herein is include those which install a traveling rail near an indoor ceiling, as well as those which arranges outdoors a traveling rail lengthwise and crosswise substantially in a horizontal direction as well.

Figure 2:
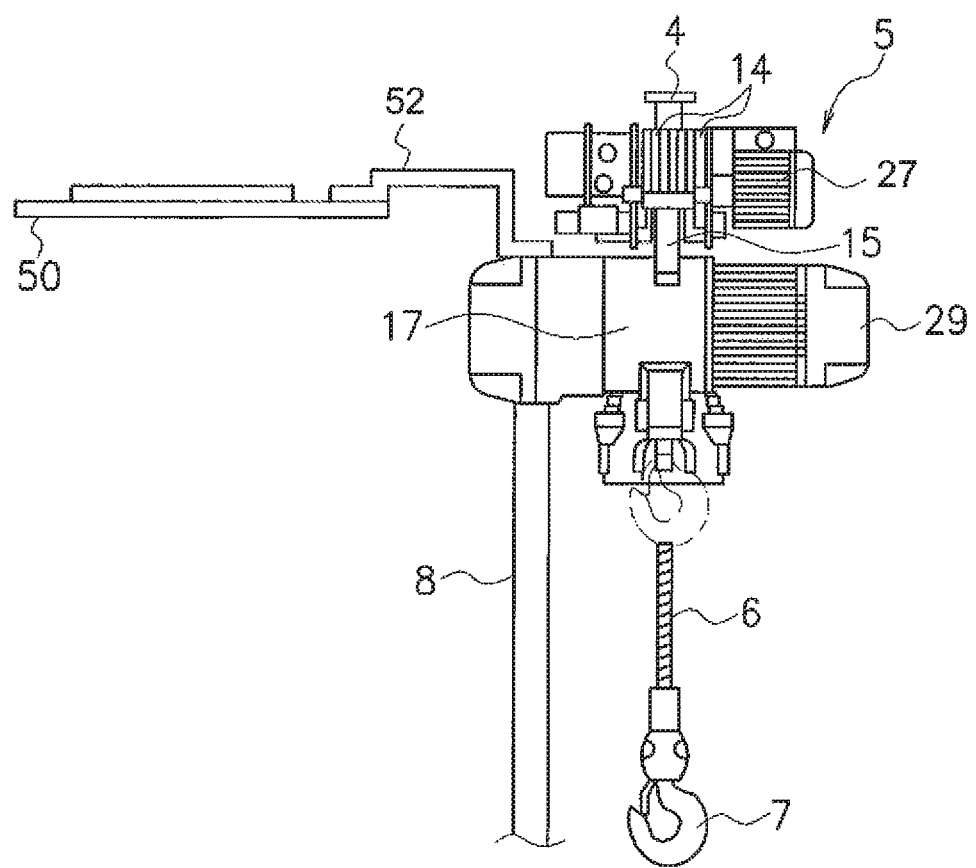
FIG. 2 is a view showing an example of a hoist as a lift of the overhead crane of FIG. 1.
Figure 3:
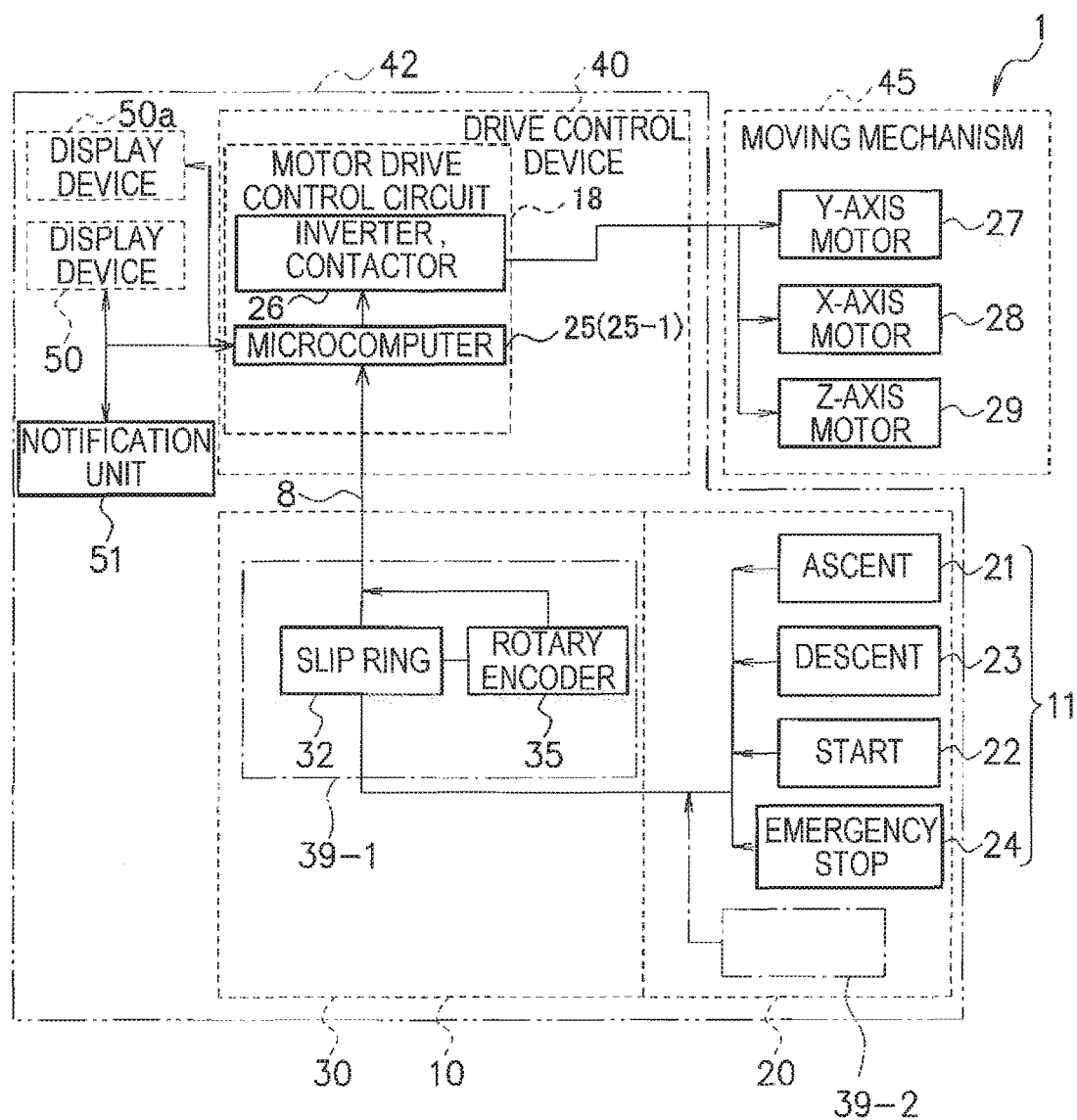
FIG. 3 is a block diagram showing an example of an electrical configuration of the overhead crane of FIG. 1.
Figure 4:
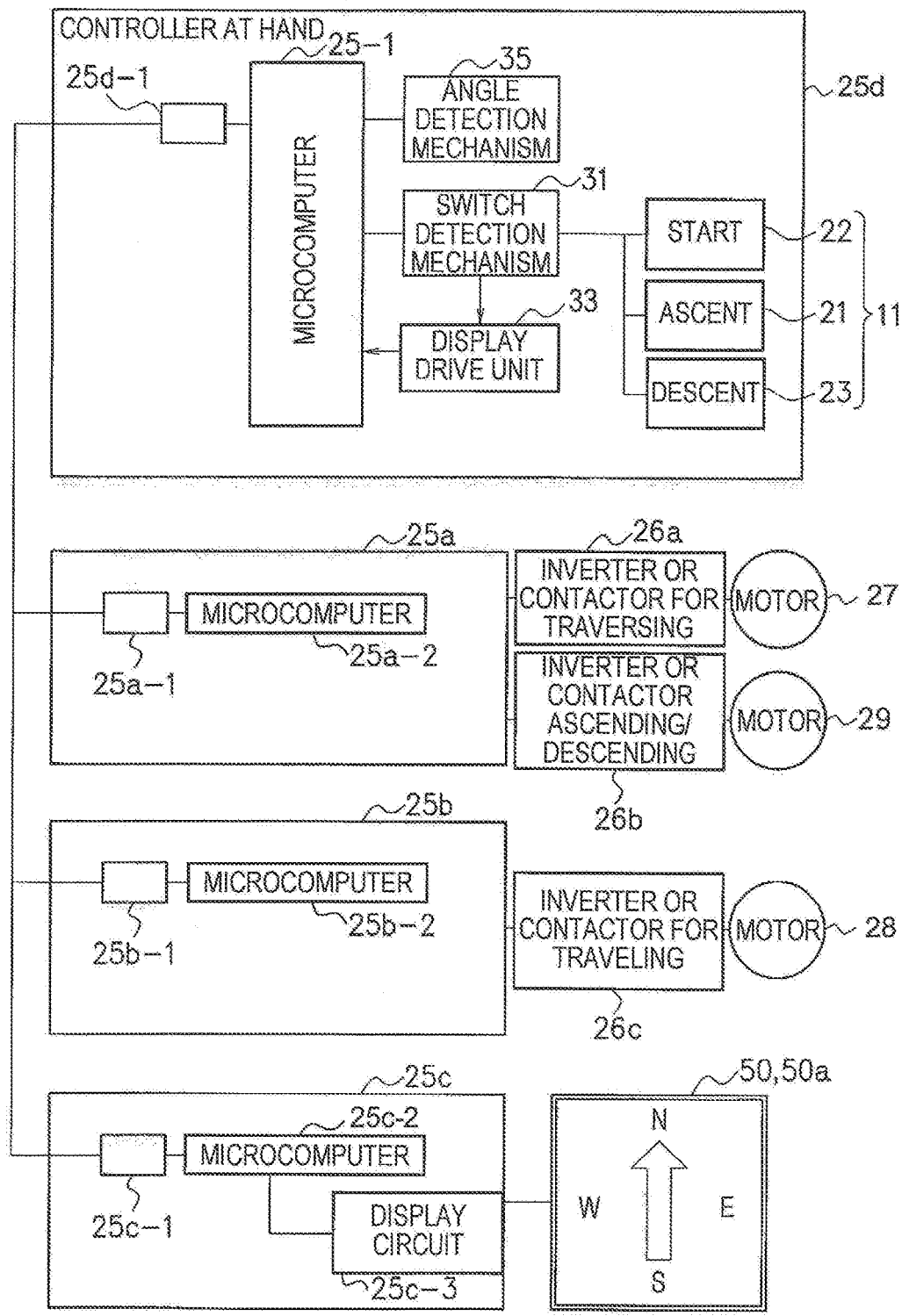
FIG. 4 is a block diagram illustrating a detailed configuration example of part of the electrical configuration in FIG. 3.

FIG. 2 is a diagram showing a structure of a hoisting machine as a lift of the overhead crane as an embodiment of the equipment of the present invention. FIG. 3 is a block diagram showing an example of an electrical configuration of the overhead crane of FIG. 1. FIG. 4 is a block diagram illustrating in detail a configuration example of part of the electrical configuration in FIG. 3.

As shown in FIG. 1, in the overhead crane 1, a crane girder 4 is laid nearly perpendicularly between traveling rails 2A, 2B. On this crane girder 4, a traveling body 5 constituting part of a moving body having a hook 7 at its tip end is moved. In addition, the overhead crane 1 is provided with a Z-axis motor that moves the hook 7 as part of the moving body in a vertical direction, and an X-axis motor and a Y-axis motor that move the hook 7 in a horizontal plane, which constitute a three-dimensional moving mechanism.

From the traveling body 5, a communication cable 8 that can bend but does not twist as an elongated member droop to a vicinity of a floor surface. A remote controller 10 as an operating device is connected to a lower end of the communication cable 8. The remote controller 10 has a first housing 20 and a second housing 30. The second housing 30 is not rotationally displaced relative to the communication cable 8. The first housing 20 is rotationally movable relative to the second housing 30.

The communication cable 8 that can bend but does not twist incorporates a communication line in a cable tube that can bend but does not twist and is electrically connected to the remote controller 10. The "cable tube that can bend but does not twist" specifically includes a metal flexible conduit and a resin-coated metal flexible conduit prescribed in JIS-C8309. For example, a Plica tube or a waterproof Plica tube, both of which are products of Sankei Manufacturing Co., Ltd. can be used.

As shown in FIG. 2, the traveling body 5 has a pair of wheels 14 provided on both sides of the crane girder 4. As a result that these wheels 14 are driven and rotationally moved by a lateral movement motor (Y-axis motor) 27, the traveling body 5 travels laterally along the crane girder 4. A hoist body 17 is suspended and supported by these laterally moving units via a support member 15. A hoist motor (Z-axis motor) 29 for hoisting or extending a support wire rope 6 is attached to the hoist body 17.

Further, display devices 50, 50a are fixed to the traveling body 5 which is part of the movable portion. Particularly, the display device 50 (50a) is connected to the hoist body 17 via a connecting member 52. The display devices 50 and 50a have the same constitution. Only one of the display devices 50, 50a may be provided. In this embodiment, the two display devices are provided in order to eliminate blind spots and improve visibility. More than two display devices may be provided.

In this embodiment, the display device 50, 50a extend at a side of the traveling body 5 to occupy an area as large as possible to an extent that its movement does not interfere with other components, so as to be clearly visible from as wider a range as possible of a work area.

That is, it is suitable that the display device is, for example, a thin display device having a square or rectangular shape.

In other words, the display device 50, which may take another form as described later, can be in a flat form as thin as possible and extends horizontally in the embodiment of FIG. 1. Specifically, the display device 50 can be configured, for example, by a liquid crystal display panel, an EL (electro-luminescence) display panel, a LED display device, an electronic display panel, a segment display phototube, and so on. In the embodiment of FIG. 1, directions of "east, west, south and north" are described on a square liquid crystal display panel. Based on the directions, a direction of movement of the traveling body 5 is indicated by changing a direction of an arrow.

Preferably, in association with contents displayed by the display devices 50, 50a, a notification unit 51 that "notifies" the contents by sound such as a buzzer or siren, light, and guidance voice is provided.

On one surface of the first housing 20 of the operating device 10 shown in FIG. 1, a button type operation switch 11 as an operation element is provided which has a plurality of stages, for example, three stages, of indentation depth. The operation switch 11, when lightly depressed and released, is configured to be returned to its original position by a force of a built-in biasing member, e.g., "spring", without being caught. That is, the switch 11 is configured, when strongly depressed, to issue an operation command corresponding to an amount of indentation, as described below, and to be returned by a spring force when released. The operation switch 11, as described later, can have any number of stages such as three or four.

In addition, a switch not only for carrying out traveling operation of the traveling body but also relating to an emergency stop button 24 for urgently stopping the traveling body can be provided.

Inside the non-rotating second housing 30, a housing direction determination mechanism 39-1 for detecting a rotational displacement relative to the rotated or rotationally moved first housing 20 is accommodated. That is, a slip ring 32 and a rotation detecting device as the housing direction determination mechanism 39-1 are accommodated inside the second housing 30 (see FIG. 3). Specifically, as the rotation detecting device, an optical rotary encoder 35 or an absolute rotary encoder, a gyro device, etc. can be used.

Here, the housing direction determination mechanism determines a direction in which the first housing 20 that rotationally moves relative to the communication cable 8 or a central axis coaxial or integral therewith is oriented. The direction detected as a result of the determination means a direction in which the movable portion which is a moving body, that is, the traveling body 5 intends to move.

The communication cable 8 is connected to the above described encoder inside the second housing 30. An extended end of the encoder extends into the first housing 20. For example, inside the first housing 20, at points equidistant from an axis line of a rotating axis extending from the rotary encoder 35 described above, and at positions on a circumference about the rotating axis as its center, a plurality of not shown signal detection mechanisms are provided. Photo sensors (interrupter photo sensors) can be used for these signal detection mechanisms. Switching is performed by inserting an interlocking member linked to the indentation of the switch 11 of the first housing 20 to an optical path of the respective photo sensors.

Thereby, as shown by an arrow AA in FIG. 1, as a result that the first housing 20 is rotationally moved relative to the second housing 30, the direction in which the housing is oriented i.e., the direction in which the traveling body 5 intends to move can be detected.

Here, the whole operating device 10 may be configured by a single housing. Alternatively, the second housing which is rotationally movable or rotatable relative to the first housing and is fixed with the communication cable may be stored in a liquid-tight manner inside the first housing.

In addition the housing direction determination mechanism, as indicated by a reference numeral 39-2 in FIG. 3, may be accommodated in the first housing 20, and the housing direction determination mechanism 39-1 of the second housing 30 may be omitted.

As the housing direction determination mechanism 39-2, it is possible to use, for example, a piezoelectric gyro or an acceleration sensor formed by a piezoelectric material, an acceleration sensor using a semiconductor, etc.

The housing direction determination mechanism 39-2, if provided, can function as a signal generator that generates a signal for determining the direction in which the first housing 20 is oriented at all times, separately from the switch for driving the traveling body 5 which is a movable portion. Thus, if the equipment is energized even if a command for driving the crane is not provided, the direction in which the second housing is oriented, i.e., the direction in which the traveling body which is movable portion intends to move can be always displayed on the display devices 50, 50a.

In addition, as shown in FIG. 2, the hoisting machine integral with the traveling body 5 has a pair of wheels 14 provided on both sides of the crane girder 4. As a result that these wheels 14 are driven and rotated by the lateral movement motor (Y-axis motor) 27, the traveling body 5 laterally moves along the crane girder 4. The hoist body 17 is suspended and supported via the support member 15 from these laterally moving units. The hoist motor (Z-axis motor) 29 for hoisting or extending the support wire rope 6 is attached to the hoist body 17. The hoist motor 29 moves up and down the hook 7 which is part of the moving body.

The saddles 3A, 3B that support the crane girder 4 shown in FIG. 1 at both ends and travel on the traveling rails 2A, 2B is respectively provided with traveling wheels and a traveling motor (X-axis motor) not shown. In addition, the hoist body 17 shown in FIG. 2 includes a built-in motor drive control circuit for driving these X-axis motor, Y-axis motor 27 and Z-axis motor 29 in accordance with the operation of the operating device.

FIGS. 3 and 4 are referred to.

The operating device 10 has an operation switch 11. Specifically, for example, the switch operation 11 is configured as an ascent switch 21, a descent switch 23, a start switch 22, and an emergency stop switch 24 in FIG. 3.

The first housing 30 incorporates a rotary encoder (optical rotary encoder) 35 as the housing direction determination mechanism. The motor drive control circuit 18 incorporated in the hoist body 17 includes a microcomputer 25-1, and inverters (or contactors) 26, 26a, 26b and 26c.

Here, in FIG. 3, the microcomputer 25-1 includes a CPU (central processing unit), memory devices such as a ROM and a RAM, and an input and output (I/O) device. The microcomputer 25-1 receives an electrical signal transmitted through the communication line in the communication cable 8 from the operating device 10 to perform required arithmetic processing, and outputs to the inverter (or contactor) 26 a result of the processing as an electric signal. The microcomputer 25-1 may be a so-called one-chip microcomputer, or may be constituted of a plurality of chips or elements and parts. FIG. 4 shows an example of using a plurality of microcomputers. The microcomputer 25-1 is mounted on the operating device 20. A communication driver 25d-1 of the microcomputer 25-1 is connected to respective communication drivers 25a-1, 25b-1 and 25c-1 of individual microcomputers 25a-2, 25b-2 and 25c-2 mounted on substrates connected to respective motors and display devices in such a manner as to be able to exchange signals by wire or radio. In other words, the communication cable 8 shown in FIG. 1 need not be wired and may be configured as a radio communication channel.

As described above, the optical rotary encoder 35 is accommodated in the second housing 30. Thus, when the second housing 20 of the operating device 10 is rotationally moved around a line in a direction in which the communication cable 8 extends or lines parallel to the line, how much degrees the second housing 20 has been rotated on either side from its original position is measured, and a measured value is sent to the microcomputer 25 via the communication line in the communication cable 8 as an electric signal.

The optical rotary encoder 35 is an example of an angle detection mechanism 35 in FIG. 3.

In the configuration of FIG. 3, there is the microcomputer 25 also on the operating device side. In addition, the Y, Z-axis motors 27, 29 are provided with microcomputers 25a-2, 25b-2, respectively, and are also provided with control substrates 25a, 25b, respectively, to be controlled by the respective communication drivers 25a-1, 25b-1. The display devices 50, 50a are also provided with a control substrate 25c, and are equipped with the microcontroller 25c-2, the communication driver 25c-1 and the display circuit 25c-3 for display drive control.

In FIG. 4, a switch detection mechanism 31 provided in relation to the operation switch 11 as the operation element in a controller at hand 25d may have a variety of configurations, as will be described later. A detection result by the switch detection mechanism 31 is sent to a display drive unit 33 connected with the switch detection mechanism 31. The display drive unit 33 determines a required display mode based on the detection result by the switch detection mechanism 31, and sends the determined display mode to the microcomputer 25-1. According to a command from the microcomputer 25-1, the microcomputer 25c-2 on the substrate 25c receives the specific display mode. A display command which complies with a display device 50 (50a) format and structure is given by the display circuit 25c-3. Various types of display modes will be later described in detail.

In FIG. 3, when the operation switch 11 is depressed, a predetermined electric signal is sent to the microcomputer 25 through the communication line in the communication cable 8 or a radio channel. The microcomputer 25 sends a control signal to the inverter (or contactor) 26. The inverter contactor) 26 supplies a drive current to the X-axis motor 28 and/or the Y-axis motor 27 in accordance with the control signal, thereby driving the X-axis motor 28 and/or the Y-axis motor 27 to drive the traveling body 5 so as move the hook 7 as a moving body in a direction in which the operating device 10 is oriented.

Here, in a case of using the inverter 26, a magnitude of a driving current supplied to the X-axis motor 28 and the Y-axis motor 27 can be controlled in a stepless manner. Therefore, the traveling body 5 can be moved linearly in a direction which the operating device 10 is oriented. However, in a case of using the contactor 26, since the magnitude of the drive current supplied to the X-axis motor 28 and the Y-axis motor 27 has a constant value, the hook 7 of the traveling body 5 can be moved only in a total of eight directions which are directions parallel to the traveling rails 2A, 2B, directions parallel to the crane girder 4, and directions in a middle of the foregoing directions. Therefore, the hook 7 of the traveling body 5, when looked at closely, travels in a zigzag pattern to move in the direction which the operating device 10 is oriented.

When buttons corresponding to the ascent switch 21 and the descent switch 23 as the up and down switches provided in the operating device 10 are depressed, a predetermined electrical signal is transmitted to a contactor incorporated in the hoist body 17 as well as the motor drive control circuit 18 through the communication line in the communication cable 8 or a radio channel. Then, when the driving current is supplied to the Z-axis motor 29 from the contactor and an ascent switch 21 is depressed, the Z-axis motor 29 operates to wind up the support cable 6 to raise the hook 7. When a descent switch 23 is depressed, the Z-axis motor 29 operates to extend the support cable 6 so as to lower the hook 7.

Therefore, an operator who operates the overhead crane 1 described in FIG. 1 first depresses the descent switch 23 of the operating device 9 to actuate the Z-axis motor 29 so as to lower the hook 7 and hook the conveyed material placed on the floor 7 with the hook 7. The operator then depresses the ascent switch 21 to actuate the Z-axis motor 29. The support wire rope 6 is wound up so as to be lifted to a height that does not impede a horizontal movement of the conveyed material. Subsequently, the operator orients the operating device 10 to a direction in which the conveyed material is desired to be moved, lightly depresses the operation switch 11, and finely adjusts the orientation of the operating device 10 while watching the moving direction of the conveyed material that is hung on the hook 7 and moved. Thereby, the conveyed material can be moved in parallel toward a desired direction.

Different from the configuration of FIG. 3, in the configuration of FIG. 4, the emergency stop button 24 may not be provided in the operating device 20. Alternatively, since the emergency stop switch 24 in FIG. 3 only sends a signal for urgently stopping driving of the moving mechanism 41 to the drive control device 40, the emergency stop switch 24 is omitted in FIG. 4.

In this case, preferably, the display devices 50, 50a in this embodiment always make display. Even if an operation command to the traveling body 5 is not given as described below, the display devices 50, 50a are configured to display the orientation of the housing, for example, by an arrow, at all times.

FIG. 5 shows a display method of the display device when the present invention is applied to an operating equipment in general as an embodiment.

Hereinafter, an embodiment will be described in which the present invention is applied to the equipment in FIG. 1. When the overhead crane 1 is started, the display devices 50,50a are activated at the same time (ST1).

What is important here is that, in not only the overhead crane but all cranes to which the present invention is applied, the display device is also activated preferably at the same time as the start-up of the equipment. Therefore, the equipment is configured such that arrows, etc. for displaying a moving direction of the traveling body and the arm which are the movable portions of the equipment are displayed at the same time as the start-up of the equipment.

Then, a command to move the traveling body and the arm which are the movable portions are given (ST2).

In the overhead crane 1 of FIG. 1, the command is provided to each moving mechanism 45 via the drive control device 40 by operating device 10. Here, if the equipment is the overhead crane of FIG. 1, the movable portion is the traveling body 5. Depending on the type of equipment, the movable portion may be an arm which pivots or a hook which is lifted and lowered. These movable portions have directions for movement depending on the type of the movable portion of such equipment. The directions for movement are horizontal and vertical directions, up or down directions, and pivoting directions which are clockwise and counterclockwise directions. A unit for starting such "movement" or "motion" may be a later described switch or the like of the operating device 10 of the overhead crane 1. There may be other various forms of operation element. A configuration of the switch will be described later in detail.

In FIG. 3, when movement or drive of the movable portion (traveling body 5 of FIG. 1, in this case) is inputted from the operating device 10 side to the microcomputer 25, the microcomputer 25 shown in FIG. 3, before start of the movement, issues a command to the display devices 50, 50a to display the direction of the movement (see FIG. 4).

Preferably, a siren or guidance voices are generated from a notification unit 51 shown in FIG. 3, to give a warning to ears of workers.

In the microcomputer 25 shown in FIG. 3, the display devices 50, 50a display the direction in which the movable portion intends to move prior to the movement (ST3). Preferably, the microcomputer 25 receives a signal indicating that the display devices 50, 50a have displayed the moving direction prior to the movement, confirms the fact (ST4), and then starts the actual movement of the moving mechanism 45 (ST5).

Here, for example, the microcomputer 25 shown in FIG. 3 may be provided with a timer in advance. The display devices 50, 50a may be allowed to display information regarding the moving direction for a predetermined amount of time. The drive control circuit 40 can be also configured to issue a command to execute the movement to the moving mechanism 45 side only after the movement direction has been displayed for a predetermined period of time, for example, about two seconds.

Thereby, the movement of the movable portion, etc. based on one command is terminated (ST6).

As above, in the present embodiment, the display devices 50, 50a are disposed to occupy the size and position which are visible from outside at least to those other than the operator of the overhead crane 1. Thereby, viewing by the person other than the operator is ensured. Moreover, since the display devices first display the operating direction of the traveling body 5 and the operation is started when the display is confirmed, escape from the operating area can be encouraged more reliably. Safety can be secured at the work site.

Figure 6A:
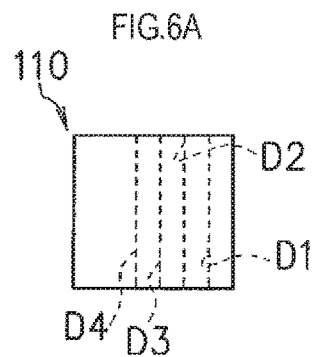
FIGS. 6A-6E are explanatory diagrams respectively showing a schematic configuration of a switch as an embodiment of an operation element which works in conjunction with the display device.

FIGS. 6A-6E are diagrams for illustrating a configuration example of a push button switch as an example of the operation element that is suitably applied to the operating device, including the operating device 10 shown in FIG. 1, of the equipment of the present invention. FIG. 6A shows a configuration example of a mechanical four-stage switch. Here, an illustrated square indicates a button body 110 or a head portion of the switch. In this switch, it is possible to select four stages of indentation depth D1 to D4 to which the switch is depressed. That is, a locking unit is disposed at each stage, so that the switch is temporarily locked at each depth. The depth at which the switch is locked can be detected by a measuring mechanism, such as an interrupter photo sensor.

For example, a not shown tact having stepped portions formed at equal intervals in a longitudinal direction is provided at a back side end of the switch 110, which is adapted to be resiliently engaged with a locking piece on the body side (body side is the housing side of the operating device). The measuring mechanism is adapted to detect a penetration depth of the tact portions.

Thus, in a "free" state where the operator does not depress the switch 110, nothing is displayed on the display device. In a state of D1 where the switch 110 is depressed to a first stage, the display device shows that the current stage is a preliminary stage for providing the movable portion or the like with a command to start, and, for example, a small arrow toward the intended moving direction is shown. When the operator depresses the switch 110 to a stage D2, the movable portion starts to move at low speed in the commanded direction. The arrow in the display device appears slightly larger so that an increase in speed is visually recognized. Then, when the operator depresses the switch 110 to a stage D3, the speed of the movable portion is further increased to reach a medium-speed stage. Correspondingly, the arrow in the display device is further expanded. When the operator depresses the switch 110 further to a stage of D4, the speed of the movable portion is further increased to reach a high-speed stage. The display device shows the arrow to its maximum size. It goes without saying that if there is a change in the direction of movement during this period, the direction of the displayed arrow is of course changed accordingly.

Figure 6B:
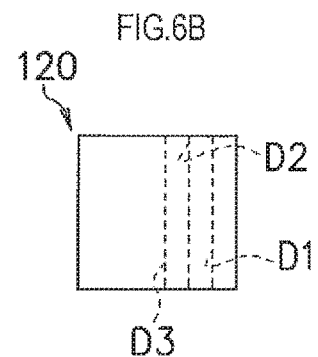

FIG. 6B shows a configuration example of a mechanical three-stage switch, which is different from the switch of FIG. 6A only in the number of control stages of three or four. The mechanical configuration, detection principle, and others of the switches are the same.

Here, an embodiment of the switch of FIG. 6B incorporated in the operating device 10 of FIG. 1 will be described with reference to FIGS. 7A-7C. The embodiment in FIGS. 7A-7C can be applied to the overhead crane shown in FIG. 1, and can be also applied to other equipment. When applied to the overhead crane in FIG. 1, however, the display device can be also devised in particular as described below.

Figure 7A:
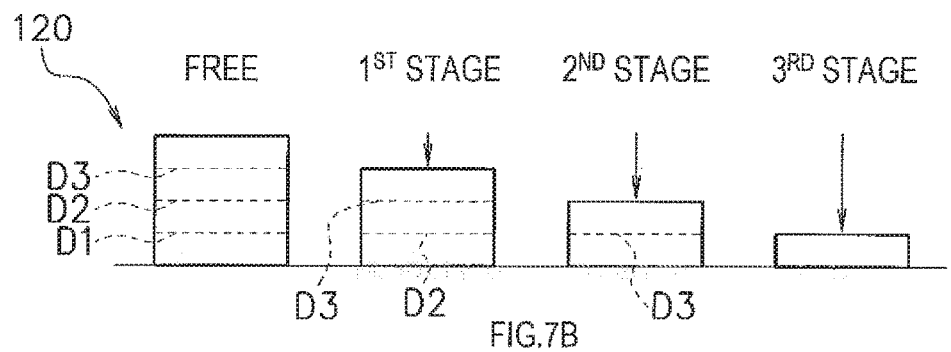
FIGS. 7A-7C are explanatory diagrams respectively showing a schematic configuration of an operating device including the switch which works in conjunction with the display device.

As shown in a first figure from the left in FIG. 7A, in a free state where the switch 120 is not depressed, a command to move has not been given to the movable portion or the like. As shown in the leftmost figure in FIG. 7C, nothing is displayed on the display device 50. On the display device 50, directions of "east (E), west (W), south (S) and north (N)" are denoted.

As shown in a second figure from the left in FIG. 7A, the switch 120 is depressed to a first stage so as to be indented to a depth of D1. Then, as shown in a second figure from the left in FIG. 7B, since only a switch S1 of a circuit 1 is conducted, the display device 50, as shown in a second figure from the left in FIG. 7C, displays a small arrow pointing to the "north" in this case as the direction in which the movable portion or the like intends to move. What is important here is that the small arrow displayed shows the direction in which the movable portion or the like moves prior to the movement and that the "move operation" is not started.

Figure 7B:
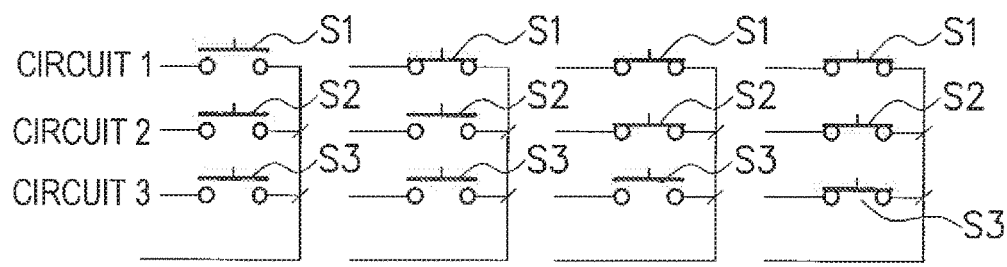
Figure 7C:
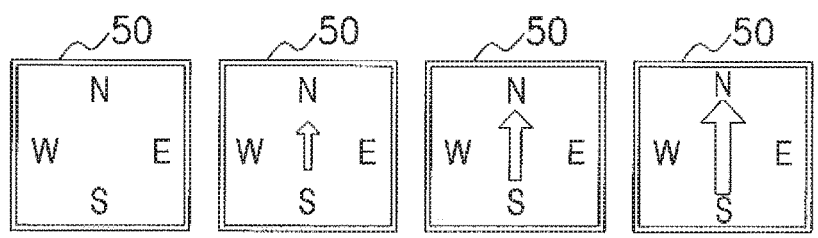

Therefore, at this stage, the workers who are around the equipment can know in advance, by viewing the second display from the left of FIG. 7C, in which direction the movable portions or the like intends to move from now. These workers, by escaping from a course of the movement, need not be injured due to an accident such as collision.

Preferably, if a siren or a buzzer, and guidance voice or the like are simultaneously generated at least at this timing from some part of the equipment, attention of the workers can be much more attracted. Viewing of the display device 50 can be prompted reliably, which contributes further to enhanced safety. In this case, an advance arrangement may be provided in which, when a siren or a buzzer having specific sound, for example, is heard, a particular display device has to be viewed to confirm the contents of the display. If such arrangement is made a common rule of conduct among the workers, it is possible to notify all of the plurality of workers (including a plurality of workers working at the same time in different workplaces) of specific information such as communication on evacuation behavior in an emergency, call of a specific person, etc. in a short time, and thus more effective.

Next, as shown in a third figure from the left of FIG. 7A, the switch 120 is depressed to a second stage so as to be indented to a depth of D2. Then, as shown in a third figure from the left in FIG. 7C, since the switches S1 and S2 of the circuit 1 are conducted, the display device 50 shows that the movable portion or the like begins to travel at low speed as a predetermined speed towards the commanded direction (north), as shown in the third figure from the left in FIG. 7C.

Here, since the size of the displayed arrow is enlarged, the workers who have viewed the enlarged arrow can readily recognize that the movable portion or the like has begun to move at low speed to the north.

Subsequently, as shown in a rightmost figure of FIG. 7A, the switch 120 is depressed to a third stage so as to be indented to a depth of D3. Then, as shown in a rightmost figure of FIG. 7C, all the switches S1, S2 and S3 of the circuit 1 are conducted. Therefore, as shown in the rightmost figure of FIG. 7C, the display device 50 shows that the movable portion or the like begins to travel at high speed as a predetermined speed towards the commanded direction (north).

At this stage, since the size of the displayed arrow is enlarged to its maximum, the workers who have viewed the enlarged arrow can readily recognize that the movable portion or the like has begun to move at high speed to the north.

In this process, if there is a command to change the moving direction of the movable portion or the like from the operating device, of course, the arrow displayed in the display device is rotated or rotationally moved to point to the corrected moving direction.

Figure 6C:
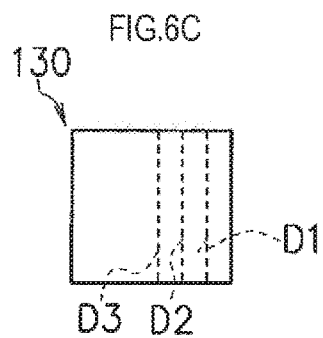

The switch 120 of FIG. 6B, as described in relation to FIG. 7A, is configured to perform switching of the switch by being depressed and deeply intended in stages. However, a switch 130 shown in FIG. 6C is not a type of switch to be indented but uses a touch sensor, i.e., a pressure sensor made of a semiconductor, incorporated in the switch. Switching of the switch 130 is performed in proportion to a pressure acting on the switch 130 caused by the operator's touch, as described in FIGS. 7A-7C. As a result, change in view of the display device 50 occurs.

In the switch 130, when the operator gently touches a key top part 13 with a finger or the like, the switch 130 comes to a free state as shown in the leftmost figure of FIG. 7A.

As an example of such touch sensor type switch, a switch of the resistive film system can be used. In the resistive film system, a thin metal film constituting a transparent electrode has resistance. When a voltage is applied to one of two sheets of facing resistive films, a voltage corresponding to the operated position is generated in the other of the resistive films. By detecting this voltage, the operated location can be detected as an analog quantity.

There are two drawbacks to the resistive film system. One is that the greater the area becomes, the lower the accuracy is. Another is that the transparency is poor because it requires two thin metal sheets. The former can be avoided by applying the matrix switch structure and independently detecting multiple areas. The latter is due to the essential structure of the resistive film system, and thus there is no workaround other than to devise material. A finger may not have to be used to depress the switch.

Alternatively, the surface acoustic wave system can be used for the switch as an operation element.

The surface acoustic wave system was developed to solve the low transparency which is a disadvantage of the resistive film system. A piezoelectric element is attached to a plurality of corners of a substrate such as glass with high rigidity to generate a vibration wave. Touching the substrate forms a fixed point. The vibration wave is absorbed at the fixed point and some is bounced. The bounce is detected by generation of a voltage of the piezoelectric element. The location of contact by a finger or the like can be detected by measuring each reflection time. This system is also known as an ultrasonic system.

The surface acoustic wave system is excellent in visibility as compared with the resistive film system, and structurally robust so that a long life can be given. Similar to the resistive film system, a finger is not necessarily used for depression but there are restrictions to some extent.

In this system, if a touch panel is mounted on a display surface, it is important whether or not the display in the back has good visibility (like a "smartphone", for example). However, the switch of the operating device does not require so much transparency and thus can be sufficiently used. In a case of the resistive film system, a finger is not necessarily be used for depression. Since there are a slightly more restrictions in the surface acoustic wave system than in the resistive film system, it is more preferable that the resistive film system is employed.

Alternatively, the touch panel system used for the switch as the operation element can employ a system using infrared rays. In this case, an infrared LED is primarily utilized as a light source. In transmission type, a position is detected by blocking the infrared light. However, depression of the switch cannot be detected only by the infrared light. In reflection type, a casing for positioning the infrared LED and its sensor around an operating surface with thickness is required. It has to be taken into account that, in or near an open-air where sunlight enters, there is a risk of malfunction due to stray light.

In addition, the touch panel system used for the switch as an operation element can also use the electromagnetic induction system. In the electromagnetic induction system, a dedicated pen called electronic pen is required. This system is the position input system for a pen tablet that does not take into account a screen display basically. However, by placing a sensor unit below a liquid crystal screen, this system can implement a touch panel without sacrificing much of the original high reading accuracy. In addition, the switch may be provided with both the capacitance system and the electromagnetic induction system. In this case, operation by a pen as well as a fingertip is possible. With an electronic pen, pen pressure and a side switch or the like can be detected. By this system, without sacrificing visibility of an electrostatic touch, a high-resolution electromagnetic induction pen can be used on an electrostatic touch which usually does not accept a pen input.

Further, capacitance may be used in the touch panel system. There are two types of capacitance type touch panels, that is, a surface type and a projection type. In both types, change in capacitance between the fingertip and a conductive film is caught to detect a position. Since capacitive coupling occurs only by moving the finger close to a sensor surface, a cursor display or the like prior to touching is possible. Depression must be made by a finger or its equivalent which is electrostatically conductive.

Figure 6D:
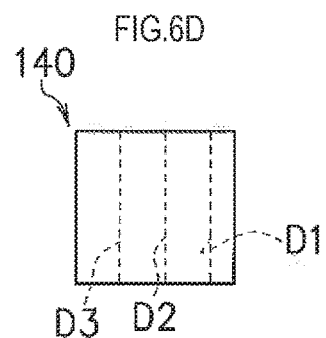

Similar to the switch 130 described in FIG. 6C, a switch 140 shown in FIG. 6D is not a switch to be indented in a direction of depth but uses a pressure sensor made of a semiconductor integrated in the switch or a piezoelectric material, etc. The switch 130 shown in FIG. 6C can be switched stepwise by a pressure generated from depression of the operator. In the switch 140 shown in FIG. 6D, in response to a pressure applied to a key top, a command to increase or decrease the speed of the movable portion or the like are given steplessly, for example, to be proportional to the applied pressure. In this case, a relation between the pressure and the speed can be stored in a memory of the microcomputer in advance as a corresponding table value or as a correlation function.

The present embodiment is advantageous over other embodiments in that speed selection can be made steplessly.

Figure 6E:
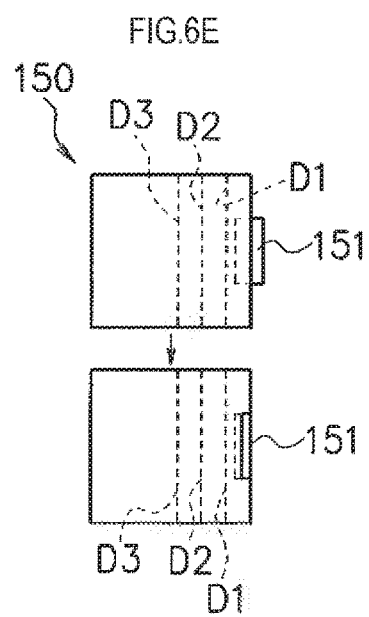

As a switch 150 shown in FIG. 6E, a switch having substantially the same structure as that of the switches shown in FIGS. 6C and 6D can be used basically. The switch 150 is different from the other switches in that a small switch 151 is provided which protrudes at a central part of the key top. This small switch 151 is a special switch provided with high sensitivity so that switching can be made by only applying a small force. That is, the operation at the first stage is carried out with a much weaker force than a force required to depress the whole switch 150. Since switching at the first stage can be done just by lightly touching the small switch 151, gloved workers with work gloves or leather gloves can easily use the switch 150.

FIG. 8 is referred to.

FIG. 8 shows an operation example of constituting the switch 22 in FIG. 3 by switch 120 or 130 of FIG. 6B or 6C, regarding the operating device 10 of the overhead crane of FIG. 1. In other words, the start switch 22 is configured to perform switching of the switch by being depressed and deeply indented in stages.

In FIG. 8, the overhead crane 1 serving as an embodiment of the equipment of the present invention is activated, so that the start switch 22 is in an operable state (ST10).

When the overhead crane 1 is activated, an angle of the first housing 20 of the operating device 10 is detected. By action of the slip ring 32 and the rotary encoder 35 as a housing direction determination mechanism, the orientation of the first housing 20 which determines the moving direction (i.e., the direction in which the housing is oriented) for the traveling body 5 as a movable portion is detected (ST11). Thus, without having to operate the start switch 22, a direction in which the traveling body 5 as a movable portion travels is detected at all times. In addition, the direction intended to progress is always shown by a small arrow on the display device 50 (ST12).

That is, in this case, unlike the embodiment of FIGS. 7A-7C, not only prior to when the operation of the movable portion or the like is started but also when there is no intention to activate the movable portion or the like, the current direction in which the second housing 30 is oriented continues to be shown by the small arrow.

In this manner, in the present embodiment, since the display devices 50, 50a show the direction in which the traveling body 5 that is the movable portion intends to move at all times, it is possible for the workers to know in advance the direction in which the traveling body 5 will travel. This is very effective in prevention of accidents.

Next, when the start switch 22 is depressed to a first stage, the traveling body 5 travels at low speed in the direction of the arrow. At this time, the display devices 50, 50a display the arrow in a medium size slightly larger than a size during stopping of the traveling body 5, in response to the speed of the traveling body 5 (ST13).

Subsequently, when the start switch 22 is deeply depressed to a second stage, the traveling body 5 travels faster at medium speed in the direction of arrow. At this time, the display devices 50, 50a display the arrow in a "large" size slightly larger than the size during stopping of the traveling body 5, in response to the increased speed (ST14).

In addition, when the start switch 22 is deeply depressed to a third stage, the traveling body 5 travels faster at high speed in the direction of the arrow. At this time, the display devices 50, 50a display the arrow to a "maximum" size which is largest as compared to the size during stopping of the traveling body 5, in response to the increased speed (ST15).

Figure 9:
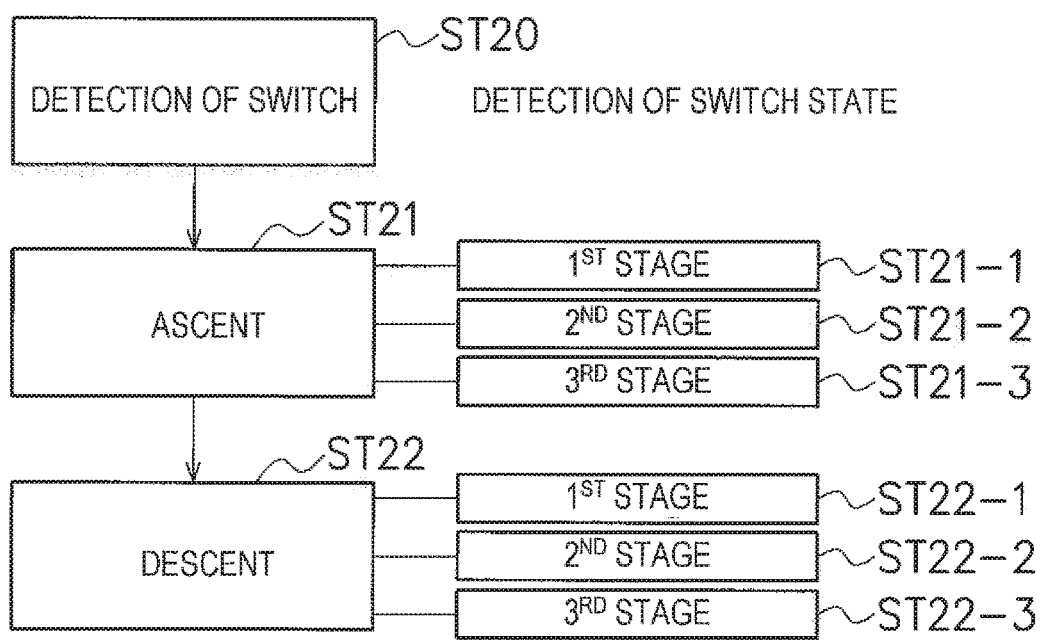
FIG. 9 is a flow diagram showing a relationship between the switch and display when the display device is provided to an equipment which moves up and down.

FIG. 9 shows a flow diagram in a case where equipment having a movable portion is provided with a mechanism that ascends and descends in an up and down direction, like the hook 7 of the overhead crane 1 of FIG. 1. That is, FIG. 9 is a flow diagram illustrating a display mode of the display device in case that control accompanied with speed change especially with up and down movement is performed. The equipment described herein includes those with a movable portion which does not move to the east, west, south and north. However, in FIG. 9, operation of those containing the ability to ascend and descend in the up and down direction will be described.

In FIG. 9, except that the moving direction is the up and down ascending and descending direction, display by the display device is carried out substantially in the same manner as those in FIGS. 7A-7C.

In FIG. 9, detection of the switch of the operating device that operates the target equipment for operation is started (ST20). Next, when the operator depresses an ascent switch among the switches, for example a button with a reference number 21 in FIG. 3, to a first stage (ST21), an arrow is displayed in a small size, pointing to an "up" direction, i.e., "upward" direction. In the first stage of the switch, the movable portion does not actually move, and only the upward direction in which the movement is expected is indicated by the arrow in the display device 50 or the like.

Next, when the worker who is the operator deeply depresses the ascent switch 21 to a second stage, the movable portion or the like starts to move at low speed in an ascending direction. In the display device 50, the arrow is displayed in a large size, pointing to the ascending direction.

Next, when the operator who is the worker deeply depresses the ascent switch 21 to a third stage, the movable portion or the like starts to move at high speed in the ascending direction. In the display device 50, the arrow is displayed in a larger size, in response to the acceleration, pointing to the ascending direction.

Now, a descent will be described in the following.

In FIG. 9, the operator depresses a descent switch, for example, a buttons with a reference number 23 in FIG. 3, to a first stage (ST22). Thereby, in the display device 50, the arrow is displayed in a small size, pointing to a "down" direction, i.e., "downward" direction. In the first stage of the switch, the movable portion does not actually move, and only the downward direction in which the movement is expected is indicated by the arrow in the display device 50 or the like.

Next, when the worker who is the operator deeply depresses the descent switch 23 to a second stage, the movable portion or the like starts to move at low speed in a descending direction. In the display device 50, the arrow is displayed in a large size, pointing to the descending direction.

Next, when the operator who is the worker deeply depresses the descent switch 23 to a third stage, the movable portion or the like starts to move at high speed in the descending direction. In the display device 50, the arrow is displayed in a larger size, in response to the acceleration, pointing to the descending direction.

Figure 10:
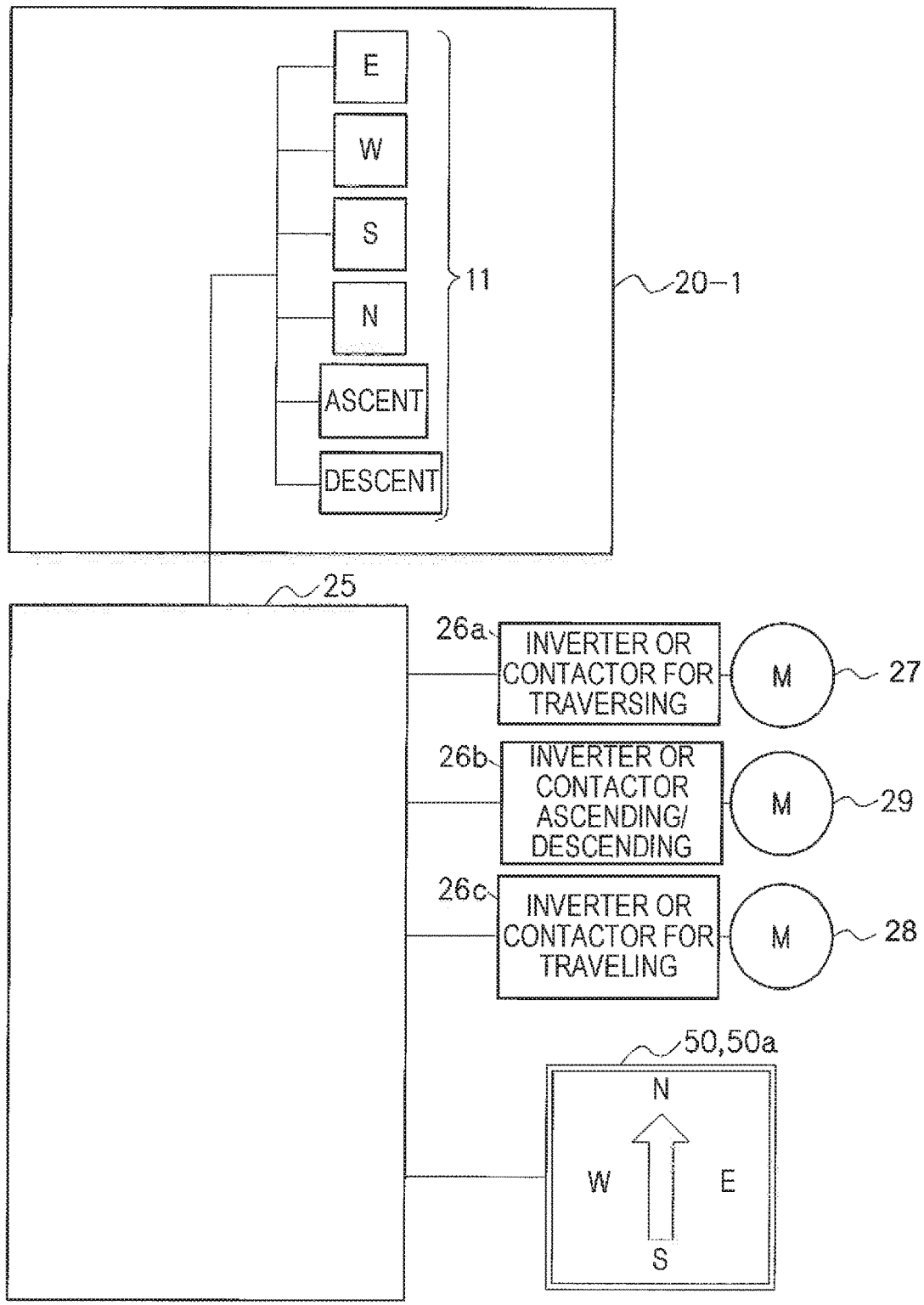
FIG. 10 is a block diagram showing an electrical configuration of an operating device and a display device of an equipment which moves up and down in east, west, south and north directions.

FIG. 10 is a block diagram showing an electrical configuration necessary for the operation described above. FIG. 10 and FIG. 4 are basically the same, except that switches for each direction of the "east, west, south, and north" are just added in FIG. 10. To avoid complication, part of the detailed configuration shown in FIG. 4 has been omitted. However, a structure which connects each switch of the operating device with the drive system is basically the same.

Figure 11:
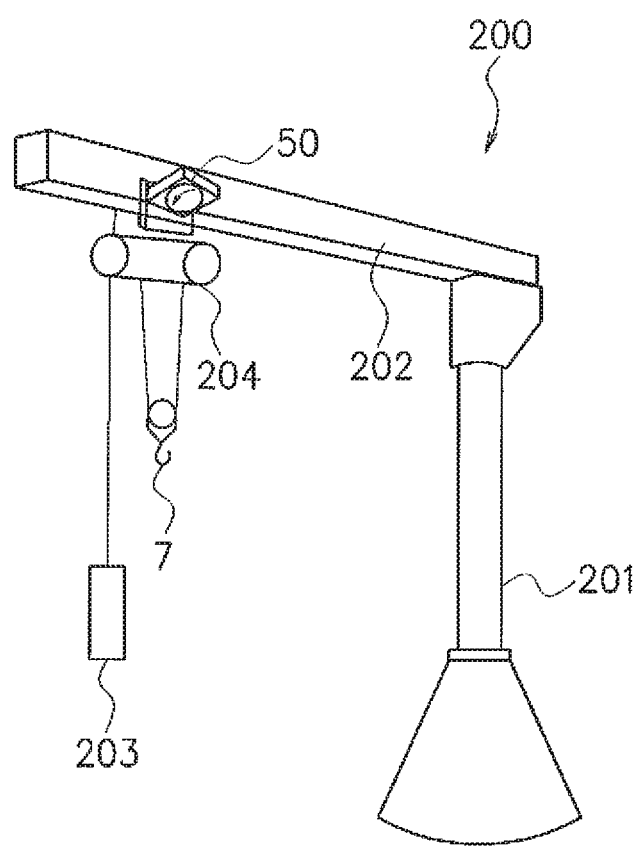
FIG. 11 is a schematic diagram showing a structure in which a display device as an embodiment of the present invention is fixed to a jib (pivot arm) of a jib crane.
Figure 12:
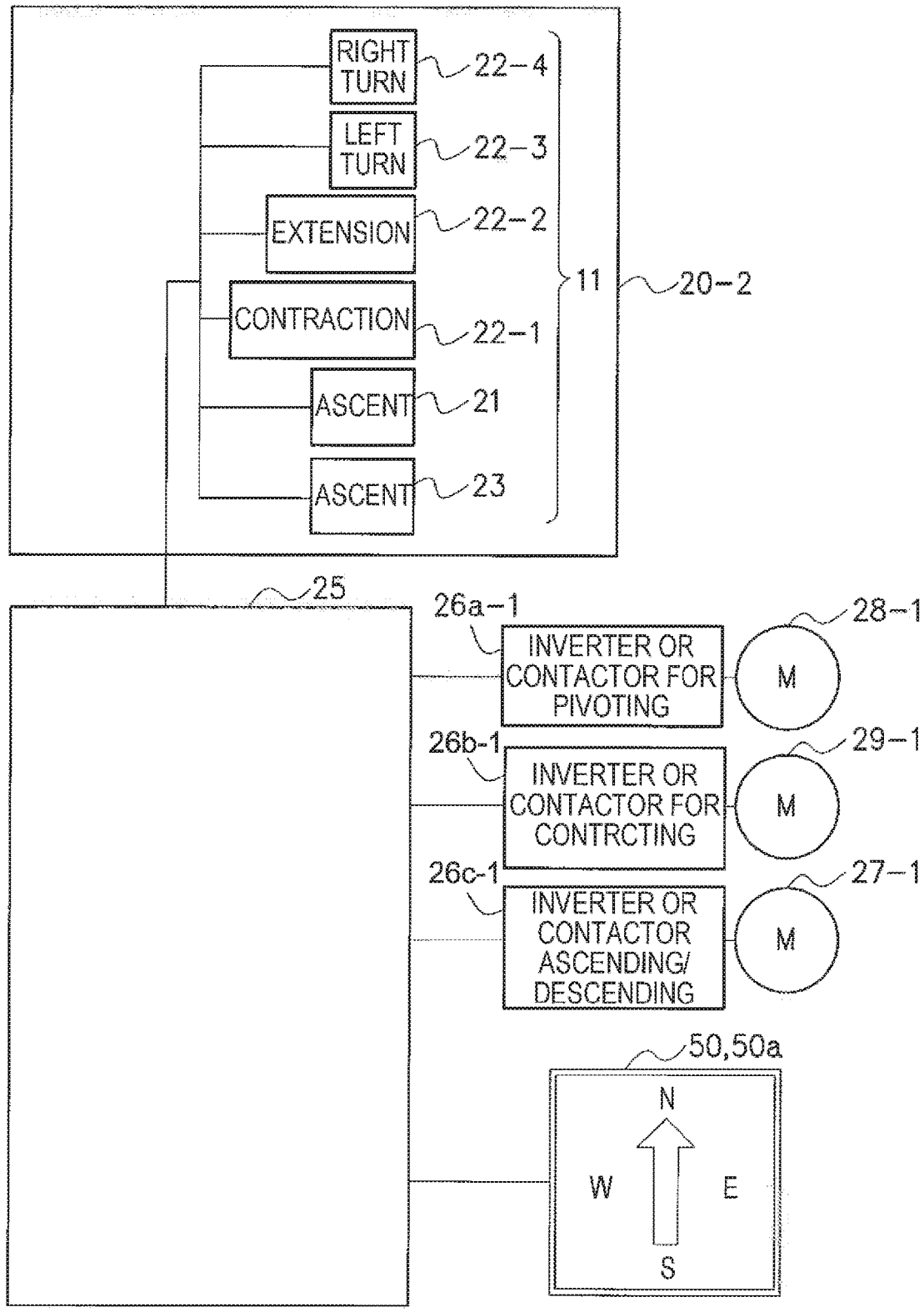
FIG. 12 is a block diagram showing an electrical configuration of the jib crane of FIG. 11.

FIG. 11 is a perspective view showing a schematic configuration of a "jib crane" according to an embodiment of the equipment of the present invention. FIG. 12 is a block diagram showing a major electrical configuration of the jib crane. FIGS. 13A-13F are diagrams showing an example of the display mode of the display device attached to the jib crane shown in FIG. 11. The jib crane to which the present invention is applied may be a "self-propelled" crane or a "fixed" crane.

In FIG. 11, a jib crane 200 includes a main body 201 which stands on a pole, and a jib which is an arm 202 that pivots around a virtual center axis of the pole of the main body 201 along its periphery, at an upper end of the main body 201.

At a tip end of the arm 201, a weight 203, a pulley 204 associated with the weight 203, and a hook 7 suspended from the pulley 204 are provided.

FIG. 12 is a block diagram showing an electrical structure of the jib crane of FIG. 11. FIG. 11 and FIG. 4 are basically the same, except that, due to replacement of the movable portion with a pivot arm, switches for respective "right turn", "left turn", "extending" and "contracting" directions 22-4, 22-3, 22-2 and 22-1 are added in FIG. 11. To avoid complication, part of the detailed configuration shown in FIG. 4 has been omitted. However, a structure which connects each switch of the operating device with the drive system is basically the same.

That is, the operating device 20-2 is connected to each inverter or contactor 26a-1, 26b-1, 26c-1 through the microcomputer 25, and connected to motors 28-1, 27-1, 29-1 which are drive units to each direction. Also, the microcomputer 25 is connected to the display devices 50, 50a.

As previously described, each switch of the operating device 20-2 may be of mechanical push system or of touch sensor system.

As shown in FIG. 11, the display device is secured to a pivot arm which is a "jib" as the movable portion 50 at a position to be easily visible to the workers including the surrounding people. A display surface of the display device 50 is facing down.

In the jib crane 200 which is the equipment of the present embodiment, the display device 50 performs a display as shown in FIGS. 13A-13F.

Figure 13A:
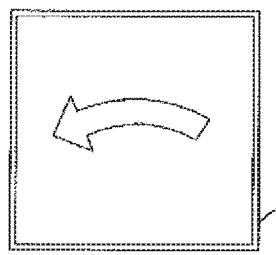
FIGS. 13A-13F are views respectively showing a display example of the display device fixed to the jib crane of FIG. 11.
Figure 13B:
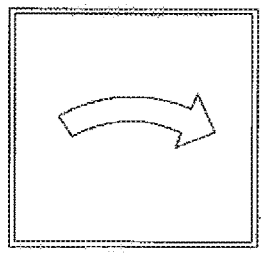
Figure 13C:
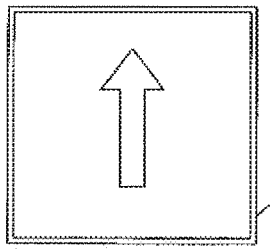
Figure 13D:
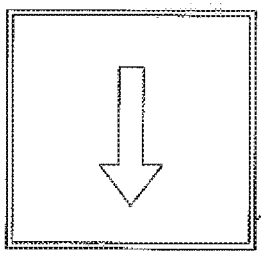
Figure 13E:
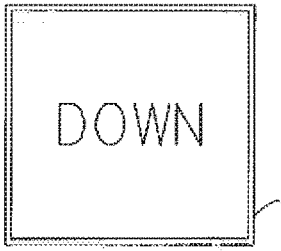
Figure 13F:
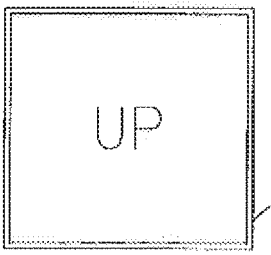

That is, when the pivot arm 202 pivots in a counter-clockwise or clockwise direction, the arrow curved to match a direction of bending by the pivoting is displayed, for example, as shown in FIGS. 13A and 13B. Further, when the pivot arm 202 moves in a lateral, i.e., horizontal direction, the arrow is displayed, for example, as shown in FIGS. 13C and 13D. Further, when the pivot arm 202 descends or ascends, the arrow may not be used. Instead, a character of "UP" or "DOWN", for example, as shown in FIGS. 13E and 13F, may be displayed for easy understanding. In this case, the arrow may be displayed in combination with the character.

These displays are given prior to start of each operation, based on the movement of the operation element described later, along with the operation by the operator described later. An example of a mechanism which enables the display of the moving direction of the arm by the display device 50 prior to the operation of the pivot arm 202 will be discussed later in detail.

Figure 14:
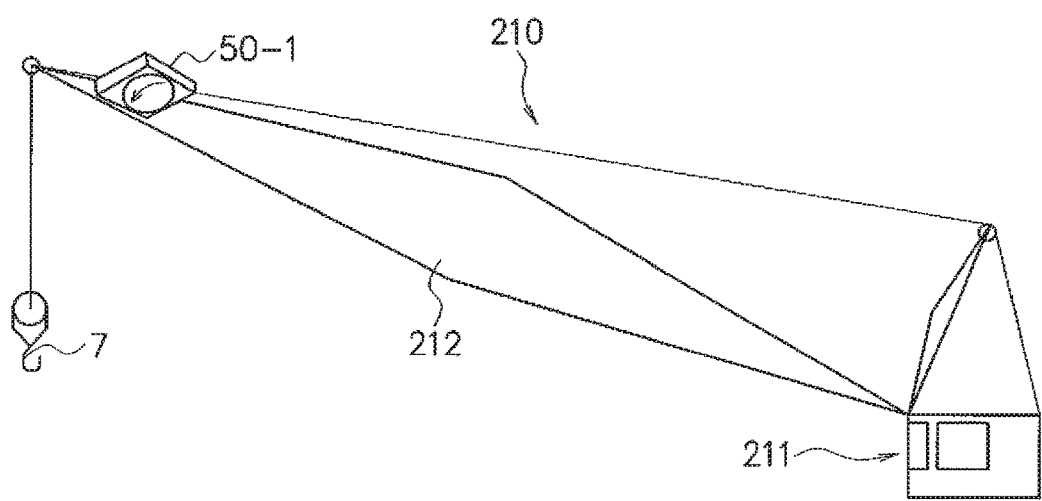
FIG. 14 is a schematic diagram showing a structure in which a display device as an embodiment of the present invention is fixed to a boom of a large construction crane as an equipment.

FIG. 14 is a schematic diagram showing an example of an embodiment of a stationary large crane to which the equipment of the present invention is applied. An operator can enter a main body 211. A steering device or the operation device is contained within the main body. A later described operation element is installed.

A long crane boom 212 extends from the main body 211. At a tip of the crane boom 212, for example, the hook 7 is attached in a vertically movable manner.

An upward angle of the crane boom 212 can be varied in a state where one end of the crane boom 212 is fixed to the main body 211. Near the tip of the crane boom 212 which can pivot along a horizontal direction, a display device 50-1 is fixed with its display surface facing a lower surface. Display given by the display device 50-1 can be the same as the example described in FIGS. 13A-13F.

It is desirable that a mounting position of the display device 50-1 is a boom side of the crane boom 212. If the display device 50-1 is installed in a vicinity of the tip end of the crane boom 212, the position of the display device 50-1 is not stable. Thus, the display of the display device 50-1 is difficult to see for the people around. In addition, if display device 50-1 is installed in a vicinity of the main body 211 side of the crane boom 21, the position of the display device 50-1 may be stabilized, but the display of the display device 50-1 may not be easy to see for the people around. On the other hand, if the mounting position of the display device 50-1 is the boom side of the crane boom 212, the back of the display device 50-1 and the boom side face each other. Thus, positioning of the display device 50-1 is easier and stable. The display is also easy to see for the people around.

FIG. 15 is a flow diagram illustrating the display mode of the display device in case that an equipment having a movable portion is an equipment like the overhead crane 1 of FIG. 1, and that directions in which a movable portion or the like, for example, the traveling body, laterally moves (horizontally moves) are set to "east, west, south and north", and control is performed with a speed change upon moving.

In this case, as the operation element provided in the operating device, it is possible to use the operation element of, for example, FIGS. 6B, 6C and 6D. In the following, the operation element of FIG. 6B is described as an example.

In FIG. 15, detection of the switch of the operating device to operate the target equipment to be operated is initiated (ST30). Subsequently, when the operator selects an "east" switch which has the same configuration as that of the switch 120 (see FIG. 6B) (ST31) and depresses the east switch to a first stage, the arrow points to the direction "east". In this case, the indentation stage is the first stage. In the first stage of the switch, the movable portion does not actually move, and only the east direction in which the movement is expected is indicated by a small arrow in the display device 50 or the like (ST31-1).

Next, when the worker who is the operator deeply depresses the east switch to a second stage, the movable portion or the like starts to move at low speed in the east direction. In the display device 50, the arrow is displayed in a large size, pointing to the east direction (ST31-2).

Subsequently, when the worker who is the operator deeply depresses the east switch to a third stage, the movable portion or the like starts to move at high speed in the east direction. In the display device 50, the arrow is displayed in a larger size, in response to the acceleration, pointing to the east direction (ST31-3).

Then, when the operator selects the switch "west" (ST32) and depresses the switch to a first stage, the arrow points to the direction "west". In this case, the indentation stage is the first stage. In the first stage of the switch, the movable portion does not actually move, and only the west direction in which the movement is expected is indicated by a small arrow in the display device 50 or the like (ST32-1).

Next, when the worker who is the operator deeply depresses the west switch to a second stage, the movable portion or the like starts to move at low speed in the west direction. In the display device 50, the arrow is displayed in a large size, pointing to the west direction (ST32-2).

Subsequently, when the worker who is the operator deeply depresses the west switch to a third stage, the movable portion or the like starts to move at high speed in the west direction. In the display device 50, the arrow is displayed in a larger size, in response to the acceleration, pointing to the west direction (ST32-3).

Then, when the operator selects the switch "south" (ST33) and depresses the switch to a first stage, the arrow points to the direction "south". In this case, the indentation stage is the first stage. In the first stage of the switch, the movable portion does not actually move, and only the south direction in which the movement is expected is indicated by a small arrow in the display device 50 or the like (ST33-1).

Next, when the worker who is the operator deeply depresses the south switch to a second stage, the movable portion or the like starts to move at low speed in the south direction. In the display device 50, the arrow is displayed in a large size, pointing to the south direction (ST33-2).

Subsequently, when the worker who is the operator deeply depresses the south switch to a third stage, the movable portion or the like starts to move at high speed in the south direction. In the display device 50, the arrow is displayed in a larger size, in response to the acceleration, pointing to the south direction (ST33-3).

Then, when the operator selects the switch "north" (ST34) and depresses the switch to a first stage, the arrow points to the direction "north". In this case, the indentation stage is the first stage. In the first stage of the switch, the movable portion does not actually move, and only the north direction in which the movement is expected is indicated by a small arrow in the display device 50 or the like (ST34-1).

Next, when the worker who is the operator deeply depresses the north switch to a second stage, the movable portion or the like starts to move at low speed in the north direction. In the display device 50, the arrow is displayed in a large size, pointing to the north direction (ST34-2).

Subsequently, when the worker who is the operator deeply depresses the north switch to a third stage, the movable portion or the like starts to move at high speed in the north direction. In the display device 50, the arrow is displayed in a larger size, in response to the acceleration, pointing to the north direction (ST34-3).

Then, when the operator selects a switch "north+east" (ST35) and depresses the switch to a first stage, the arrow points to a direction "north+east" (northeast). In this case, the indentation stage is the first stage. In the first stage of the switch, the movable portion does not actually move, and only the northeast direction in which the movement is expected is indicated by a small arrow in the display device 50 or the like (ST35-1).

Next, when the worker who is the operator deeply depresses the north+east switch to a second stage, the movable portion or the like starts to move at low speed in the northeast direction. In the display device 50, the arrow is displayed in a large size, pointing to the northeast direction (ST35-2).

Subsequently, when the worker who is the operator deeply depresses the north+east switch to a third stage, the movable portion or the like starts to move at high speed in the northeast direction. In the display device 50, the arrow is displayed in a larger size, in response to the acceleration, pointing to the northeast direction (ST35-3).

Then, when the operator selects a switch "south+east" (ST36) and depresses the switch to a first stage, the arrow points to a direction "south+east" (southeast). In this case, the indentation stage is the first stage. In the first stage of the switch, the movable portion does not actually move, and only the southeast direction in which the movement is expected is indicated by a small arrow in the display device 50 or the like (ST36-1).

Next, when the worker who is the operator deeply presses the south+east switch to a second stage, the movable portion or the like starts to move at low speed in the southeast direction. In the display device 50, the arrow is displayed in a large size, pointing to the southeast direction (ST36-2).

Subsequently, when the worker who is the operator deeply depresses the south+east switch to a third stage, the movable portion or the like starts to move at high speed in the southeast direction. In the display device 50, the arrow is displayed in a larger size, in response to the acceleration, pointing to the southeast direction (ST36-3).

Then, when the operator selects a switch "south+west" (ST37) and depresses the switch to a first stage, the arrow points to a direction "south+west" (southwest). In this case, the indentation stage is the first stage. In the first stage of the switch, the movable portion does not actually move, and only the southwest direction in which the movement is expected is indicated by a small arrow in the display device 50 or the like (ST37-1).

Next, when the worker who is the operator deeply depresses the south+west switch to a second stage, the movable portion or the like starts to move at low speed in the southwest direction. In the display device 50, the arrow is displayed in a large size, pointing to the southwest direction (ST37-2).

Subsequently, when the worker who is the operator deeply depresses the south+west switch to a third stage, the movable portion or the like starts to move at high speed in the southwest direction. In the display device 50, the arrow is displayed in a larger size, in response to the acceleration, pointing to the southwest direction (ST37-3).

Then, when the operator selects a switch "north+west" (ST38) and depresses the switch to a first stage, the arrow points to a direction "north+west" (northwest). In this case, the indentation stage is the first stage. In the first stage of the switch, the movable portion does not actually move, and only the northwest direction in which the movement is expected is indicated by a small arrow in the display device 50 or the like (ST38-1).

Next, when the worker who is the operator deeply depresses the north+west switch to a second stage, the movable portion or the like starts to move at low speed in the northwest direction. In the display device 50, the arrow is displayed in a large size, pointing to the northwest direction (ST38-2).

Subsequently, when the worker who is the operator deeply depresses the north+west switch to a third stage, the movable portion or the like starts to move at high speed in the northwest direction. In the display device 50, the arrow is displayed in a larger size, in response to the acceleration, pointing to the northwest direction (ST38-3).

FIGS. 16A-16D show display examples of the display device as described above.

Figure 16A:
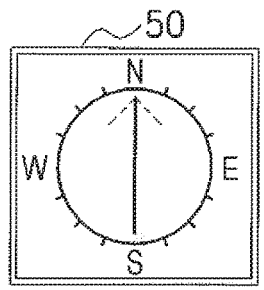
FIGS. 16A-16D are views respectively showing a display example of the display device in a case of forming a scale in the operating device.
Figure 16B:
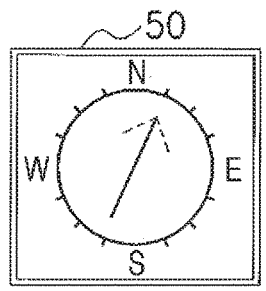
Figure 16C:
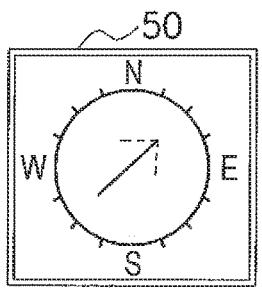
Figure 16D:
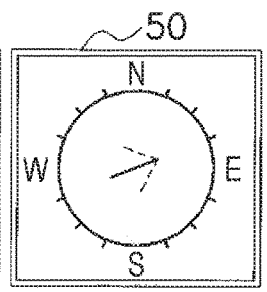

That is, FIG. 16A is a display example of the movable portion or the like moving at high speed in the north direction. FIG. 16B is a display example of the movable portion or the like moving at slightly high speed in a north-northeast direction. FIG. 16C is a display example of the movable portion or the like moving at medium speed in the northeast direction. FIG. 16D is a display example of the movable portion or the like moving at low speed toward the east-northeast. It is preferable that only ticks pointed by these arrows (for example, a tick in the north in the FIG. 16A) may be colored differently from others or may be "lighted", etc.

As a result, not only the tip end of the arrow but also the tick itself pointed by the arrow is conspicuous, the arrow is easy to visually recognize.

FIG. 17A is a display example in which only the characters "UP" and "DOWN" are shown in the display device, without an arrow, so that a forecast of ascending and descending movement can be easier to understood. Depending on the speed of the movement, the size of the characters may be changed. The color of the characters may varied depending on difference in direction.

FIG. 17B is a display example of FIG. 17A further added with an arrow and indications of east, west, south and north.

FIG. 18 is an example showing a case of forming a three-dimensional display device. The display device shown is in a form of a truncated pyramid with its four dimensions gradually reduced downward. In this example, a horizontal cross-sectional area is reduced downward. In this way, the arrow is displayed a three-dimensionally and easy to understand. The three-dimensional display device is not limited to this shape, and can be other pyramids. Any geometric shape, such as an eight-sided pyramid, a cone, cylinder or the like, can be used. If the three-dimensional display device is in a form of a truncated pyramid with four dimensions reduced gradually downward as shown, it is easy to view for the worker who looks up from below.

If the display device is a pyramid as shown in FIG. 18, each orientation of "east (E), west (W), south (S), and north (N)" can be indicated on an outer surface of the pyramid. In addition, if the display device is an eight-sided pyramid, each intermediate orientation of the four orientations can be also indicated.

FIGS. 19A to 19F illustrate various display modes of the display device 50.

FIG. 19A shows a mode in a stepwise manner in which an arrow indicating the north (the movable portion or the like is moving to the "north") on a dot matrix display panel is gradually reduced in size from a left end figure toward the right. These figures show that, for example, in any of the switches 110, 120, 130 and 140, etc. described in relation to FIGS. 6A-6E, the amount of indentation is shown by an arrow different in size in accordance with a depth or strength of the depression.

FIG. 19B is basically the same as FIG. 19A. However, the tip end of the arrow always occupies the same position in FIG. 19B.

FIG. 19C is the same as FIG. 19A in that the size of the arrow to be displayed is varied in accordance with the amount of indentation (speed) of the switch, and is only different in that the display panel is a non-dot matrix in FIG. 19C.

FIG. 19D shows arrows all in the same size pointing the north. It is difficult to show, but, even if the arrows are the same size, the difference in speed may be shown by changing the color.

FIG. 19E is an example showing, in addition to the arrow display similar to that FIG. 19A, whether a suspended load hanging on the hook 7 shown in FIG. 2 is ascending or descending, for example, with a character "UP" or "DOWN". The character portion may be changed in color or blinked, in order to more strongly attract the attention of the workers.

In FIG. 19F, display contents are changed from a right view to a left view. Specifically, for example, the "arrow" itself is configured to move toward the "north (N)" which is the moving direction of the movable portion. In other words, the display by the display device 50 is made "animation" display. Thus, with the display in motion, the arrow may be seen to be easily understood by the workers.

FIGS. 20A-20B are schematic diagrams showing an example of an embodiment in which the equipment of the present invention is applied to a "track with UNIC". Other than the above, the equipment of the present invention can be applied to a vehicle in general which has a movable portion or a moving arm or the like, such as a "self-propelled mobile crane", a "shovel" or a "fire ladder".

In FIG. 20A, a track 220 is provided with pallets 222 on a chassis 221, an elongated body 223 vertically extending from the chassis or a carrier, and a slope arm 224 extending obliquely rearward from an upper end of the body 223 while gradually rising. An inclination angle of the slope arm 224 can be varied. At a tip end of the slope arm 224, a lifting mechanism and the hook 7 provided at a lower end of the lifting mechanism are provided. The slope arm 224 and the lifting mechanism constitute a lifting device.

Preferably, in the middle of the slope arm 224 which is a movable portion as shown in FIG. 20B, the two display devices 50 and 50 are fixed in a manner to sandwich the slope arm 224 so as to follow the slope of the slope arm 224.

In addition, to an upper end of the slope arm 224, the display device 50a is horizontally fixed.

Here, the display device 50 fixed to the slope arm 224 and the display device 50a fixed to the upper end of the slope arm 224 may play different roles, such that the display device 50 displays a pivoting direction of the slope arm 224, and the display device 50a displays ascent and descent of the hook 7. Or, both the display devices 50 and 50a may display the pivot of the slope arm 224 and the ascent and descent of the hook 7 at the same time.

FIGS. 22A-22F show substantially the same display modes as those of the display device described in FIGS. 13A-13F, and thus the description is not repeated.

FIG. 21 is an operating lever provided close to a cab inside the not shown track 220, which is an example of the "operation element".

By gradually moving the lever 225 toward a direction of arrow, it is possible to give a command to pivot to the slope arm 224.

Figure 22:
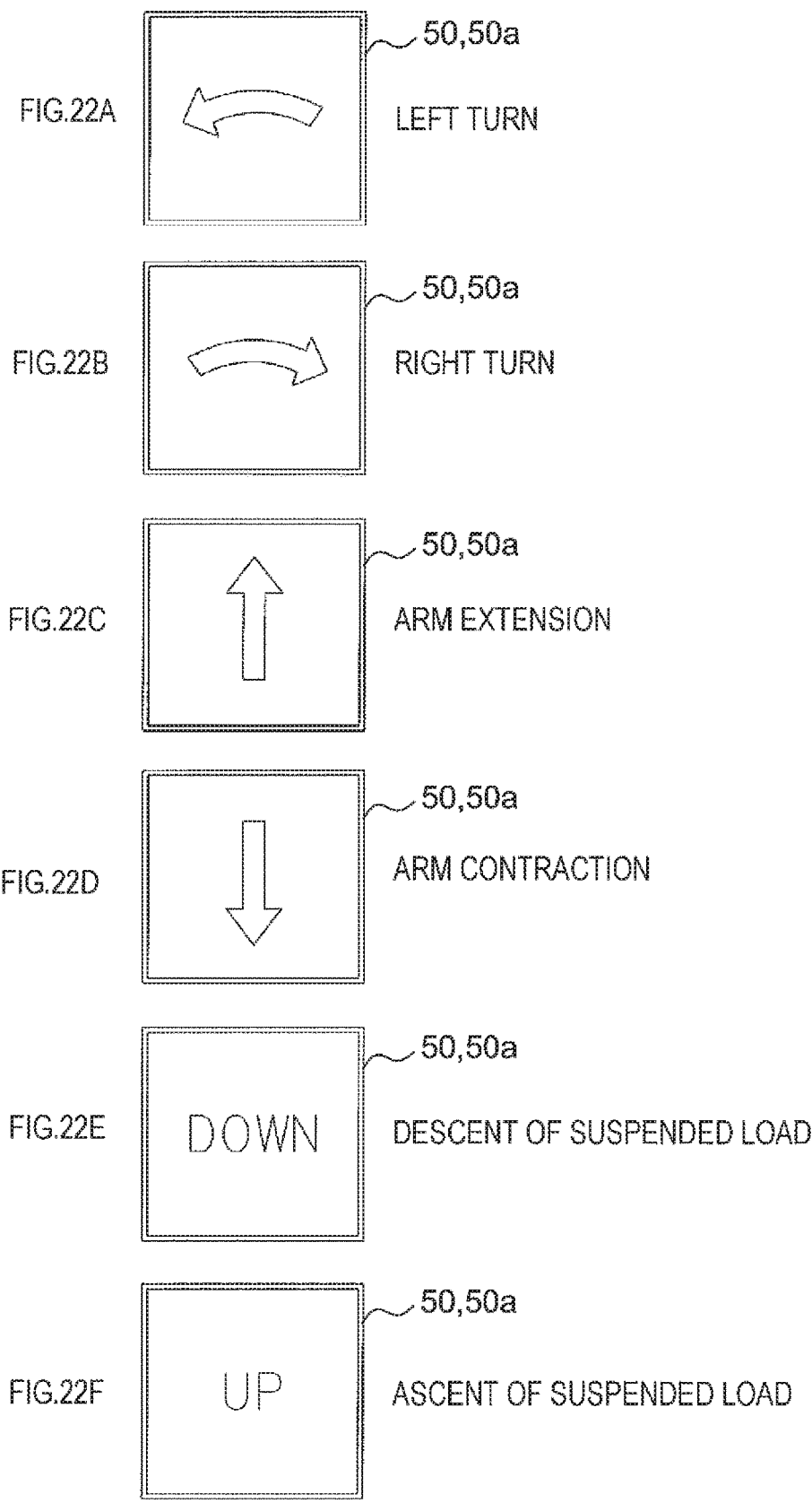
FIGS. 22A-22F are views respectively showing a display example of the display device of the equipment of FIG. 20.

In this case, the operation lever 225 is formed of a cantilever elastic rod or the like with a constant "play region" so as to be able to swing substantially without torque" in the operation direction as shown. When the worker starts crane operation to activate the slope arm 224, using this "play region", and operates the operation lever 225 so that the slope arm 224 moves within the "play region", the pivoting direction of the slop arm 224 is quickly displayed on the display device 50 as shown in FIGS. 22A-22B. The slope arm 224 does not pivot at this stage. Preferably, after the display of the pivoting direction is confirmed through a circuit, the pivot of the slope arm 224 can be started for the first time.

Thus, it is possible for the workers in a vicinity of the track 220 to visually recognize the pivoting direction of the slope arm 224 by the display device 50 prior to the operation. Thus, needed escape can be made and safety in work can be ensured.

Figure 23:
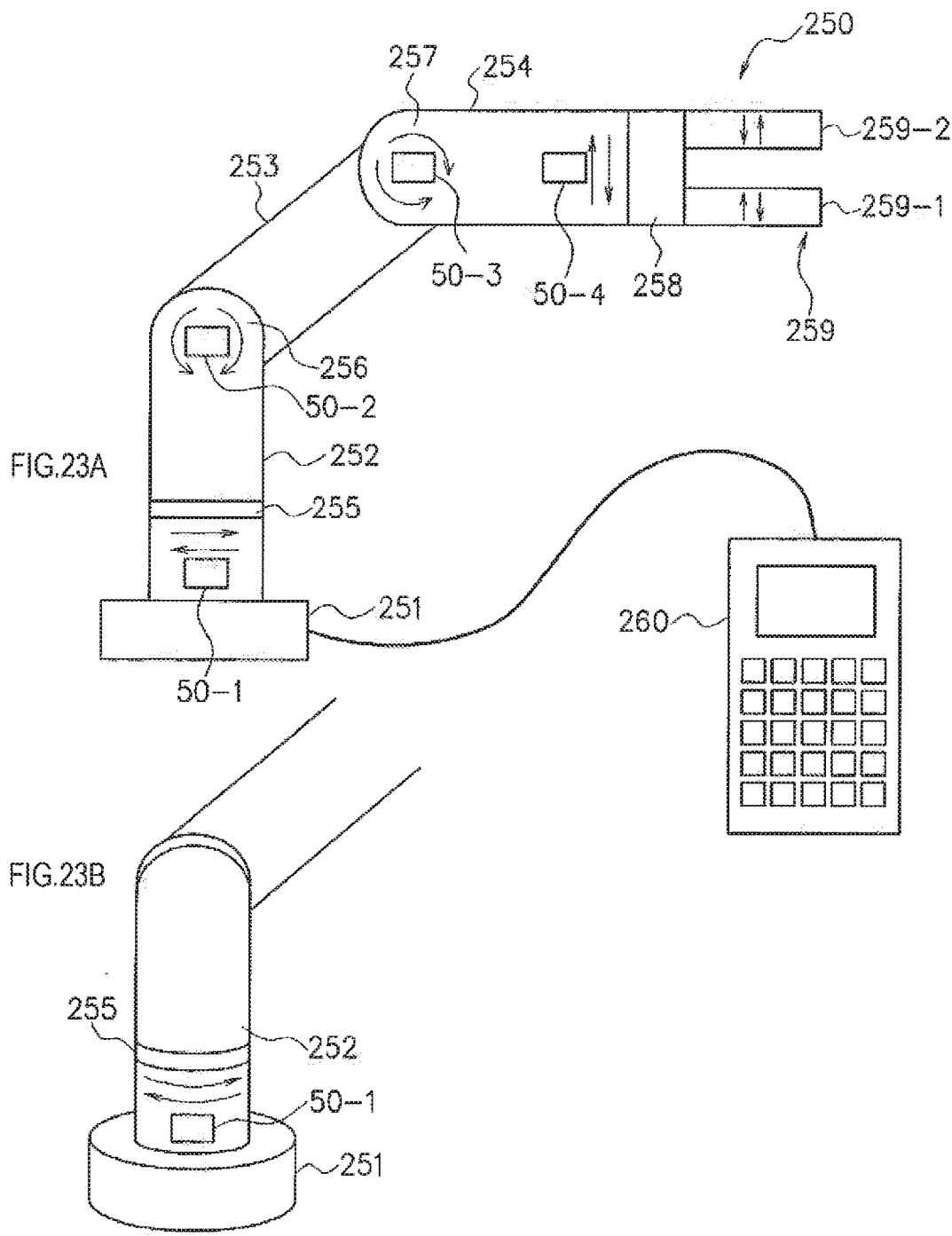
FIGS. 23A-23B are explanatory diagrams respectively showing an example in which a display device is provided to a drive shaft (motion axis) of an equipment such as an industrial robot.

FIGS. 23A-23B are schematic diagrams showing an arm robot 250, such as an industrial robot, as an example of the equipment of the present invention.

The arm robot 250 is a four-axis rotation robot. The arm robot 250, as shown in FIG. 23A, includes a base 251, a support post 252 standing perpendicularly from the base 251, a first arm portion 253 rotatably mounted to an upper end of the support post 252, and a second arm portion 254 rotatably mounted to a tip end side of the first arm portion 253. The arm robot 250 is adapted to be operated by an operating device (remote controller) 260.

As shown in FIG. 23B, the support post 252 has a first rotation shaft 255 which is rotated around a virtual vertical center axis. In close proximity to the rotation shaft 255, a first display device 50-1 similar to the display device described also in other embodiments is provided exposed to an outer surface. The first display device 50-1 can display a pivoting direction and a pivoting speed of the rotation shaft 255 upon the rotation.

Further, a second rotation shaft 256 is provided at an upper end of the support pole 252. The rotation shaft 256 can rotate the first arm portion 253 as indicated by arrows. Near the upper end of the support pole 252, a second display device 50-2 is provided. The second display device 50-2 is adapted to show a pivoting direction and a pivoting speed of the first arm portion 253.

Further, at a connection point of the second arm portion 254 with the first arm portion 253, a third rotation shaft 257 is provided. The third rotation shaft 257 is adapted to rotate the second arm portion 254 in a direction of arrow. In a vicinity of the third rotation shaft 257, a third display device 50-3 is provided. The third display device 50-3 is adapted to show a pivoting direction and a pivoting speed of the second arm portion 254.

A fourth rotation shaft 258 is provided at a tip end of the second arm portion 254. The fourth rotation shaft 258 can rotate, for example, a hand portion 259 including rod-like gripping arms 259-1, 259-2 extending parallel to each other substantially horizontally in FIG. 23A, in a direction of arrow. A fourth display device 50-4 is provided in proximity to the fourth rotation shaft 258. The fourth display device 50-4 is adapted to be able to display a pivoting direction and a pivoting speed when the hand portion 259 is rotated around the virtual vertical center axis of the second arm portion 254. The gripping arms 259-1, 259-2 of the hand portion are adapted to be able to grip a target object by coming close to or drawing away from each other, as shown by arrow.

Teaching work of the industrial robot, such as the arm robot 250, is performed by using actual work. This teaching work is typically done using a substantially narrow space, and is often done close to other devices, jigs, and robots.

Therefore, driving of a wrong shaft an unintended direction immediately leads to crash into other device and jig.

In addition, a safety device such as an area sensor may be deactivated during the teaching work. Thus, driving of a wrong shaft and pivoting in an unintended direction are more dangerous than during normal working.

Thus, the first to fourth display devices 50-1, 50-2, 50-3 and 50-4 display the pivoting direction prior to each pivoting operation. Thereby, the operating direction before the operation can be visually recognized quickly, to prevent such accidents. The display device is provided integrally with the arm 254 as a movable portion.

Figure 24:
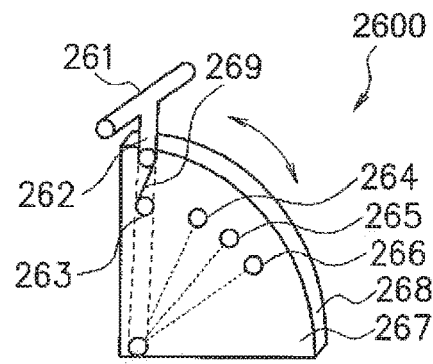
FIG. 24 is an explanatory diagram showing an example of an operation element which is made work in conjunction with display of the display device of the equipment.

FIG. 24 shows another example of the operating element, and shows a schematic configuration of a lever-type operating element 2600 of so-called "torque converter" type.

In the lever-type operating element 2600, a vertical shaft 262 extends downward from a grip portion 261. The lever-type operating element 2600 can ascend and descend within a slit 268 in a direction of arrow. In this operating element, a guide portion 267 having a side wall across the slit 268 is formed. On the side wall of the guide portion 267, a plurality of contacts are provided which create a closed circuit in contact with a terminal plate 269 such as a leaf spring made of an elastic conductor provided on a perpendicular shaft on the grip portion 261 side.

The contacts are, for example, a first contact 263, a second contact 264, a third contact 265, and a fourth contact 266.

When the operator grasps and lowers the grip portion 261, and as soon as the first contact 263 is separated from the terminal plate 269, a small arrow is displayed on a display device similar to the display device described in other embodiments, for example. At this point, the not shown movable portion or the like connected to the lever-type operation element 260 does not move.

Subsequently, when the grip portion 261 is further lowered, the terminal plate 269 is brought into contact with the second contact 264. The movable portion or the like starts to move. The arrow on the display device is enlarged.

As the grip portion 261 is lowered 265, a moving speed of the movable portion or the like connected thereto is increased, and as the terminal plate 269 is sequentially brought into contact with the third contact 265 and the fourth contact 266, the arrow on the display device can be enlarged. The second contact 264, the third contact 265 and the fourth contact 266 may not be used for a switch for issuing a command to gradually increase the speed, and may be used for a switch for changing the direction of movement.

In addition, as soon as the operator grabs and moves the grip portion 261 in a lowering direction of the arrow, and the terminal plate 269 touches the second contact 264, a member (not shown) which can be a mechanical stopper may enter into the slit 268 by a command from a not shown circuit, and prevent further lowering operation of the grip portion 261 for a predetermined amount of time. It is preferable that working time of the stopper can be arbitrarily changed in advance, for example, "two seconds".

Figure 25:
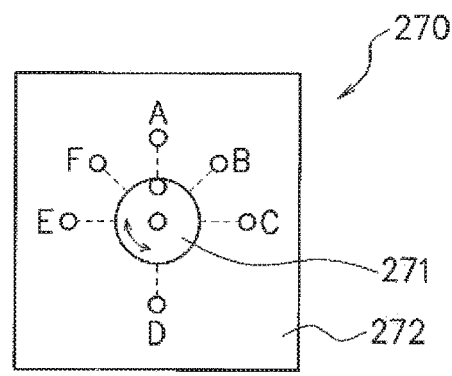
FIG. 25 is an explanatory diagram showing an example of an operation element which is made work in conjunction with display of the display device of the equipment.

FIG. 25 shows another example of the operation element, which is a rotary switch type operation element 270 having a so-called "knob portion 271".

In the illustrated example, contacts A, B, C, D, E and F to change over the switches are arranged in positions at regular intervals on a concentric circle around the near circular knob portion 271 which can be rotated (rotatable in clockwise and semi-clockwise directions). Thus, only by gripping and rotating the knob portion 271 in the respective directions, it is possible to change a direction of movement of the movable portion. Also, it is possible to give a command for a display operation of the display device that is connected to the movable portion at the same time.

Here, the contacts B and F are the contacts that command that only the direction of movement is shown by an arrow in the display device. Merely rotating the knob portion 271 to the contact positions does not start movement of the movable portion or the like. When the knob portion 271 is further rotated, the movable portion or the like starts moving. Depending on an angle of the rotation, a moving speed determined at each contact position is achieved. To the display device as well, it is possible to display the arrow so that the size of the arrow becomes sequentially large.

Figure 26:
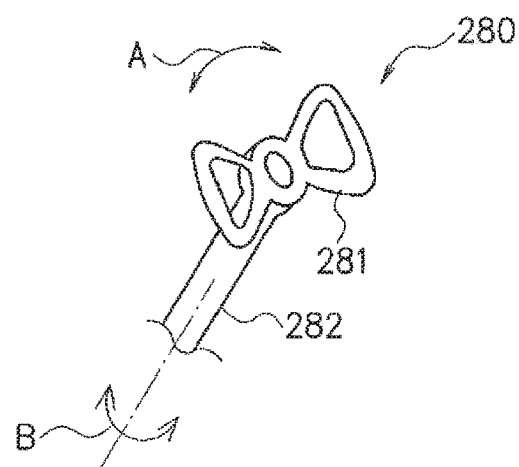
FIG. 26 is an explanatory diagram showing an example of an operation element which is made work in conjunction with display of the display device of the equipment.

FIG. 26 shows a handle-type operation element 280.

An operator grips a handle portion 281 to rotate the operation element 280 in a direction of arrow A. As a result, a pole 282 extending from the handle portion 281 rotates in a direction of arrow B. By configuring a contact structure substantially similar to that is described in connection with FIG. 25, effects similar to those in FIG. 25 can be obtained.

Various modifications can be added to the present invention without limitation to the configuration shown in the embodiments described above and each figure. In addition, some of the specific components of each embodiment can be omitted, or part of components of each embodiment may be combined with each other.

(1) For example, the display device may display information other than the above-described arrows, characters, colors and the like.

If, when the worker who operates the operating device selects an appropriate operation element, information about tasks of the worker concerned to carry out, information on work to be done next, information on a moving path of the movable portion (including information on prior notice of movement), information relating to goods to be conveyed by the movable portion (material and weight of the goods, starting point, transit point, and end point of conveyance of the goods, etc.), tips helpful to each task and relevant information are displayed on the display device, it is possible to improve work efficiency of the worker. Display of such information is very useful for the operator who does not have sufficient work experience.

(2) The display device may display information necessary or useful for not only the workers but to the public. For example, display of information regarding occurrence of earthquake and other disasters, earthquake intensity, wind speed, weather and their change, whether or not to evacuate, and a shelter nearest can give a sense of security to the workers as well as to the public. In addition, risk of damage can be reduced. If the display device displays traffic information such as congestion information of roads, and delay information of trains, etc., it is possible to reduce possibility of being caught in traffic trouble.

By displaying information on current affairs, live information of sports, advertising information of the company on the display device, the equipment can be also used for public viewing. In this case, it is advantageous because, even when the equipment according to the present invention is not used, the display device provided in the equipment can be used as a source to send various types of information.

In addition, if such display is directed to more people, it is desirable to set up the display device to a higher place. For example, it is desirable that the display device 50-1 shown in FIG. 14 is disposed on the side surface of the boom of the crane boom 212, as described above. However, as closer to near the tip end of the boom, the display device 50-1 can be located at a higher place. Thus, it is more desirable that the display device 50-1 is disposed closer to the vicinity of the tip end of the boom, on the side surface of the boom.

Figure 27:
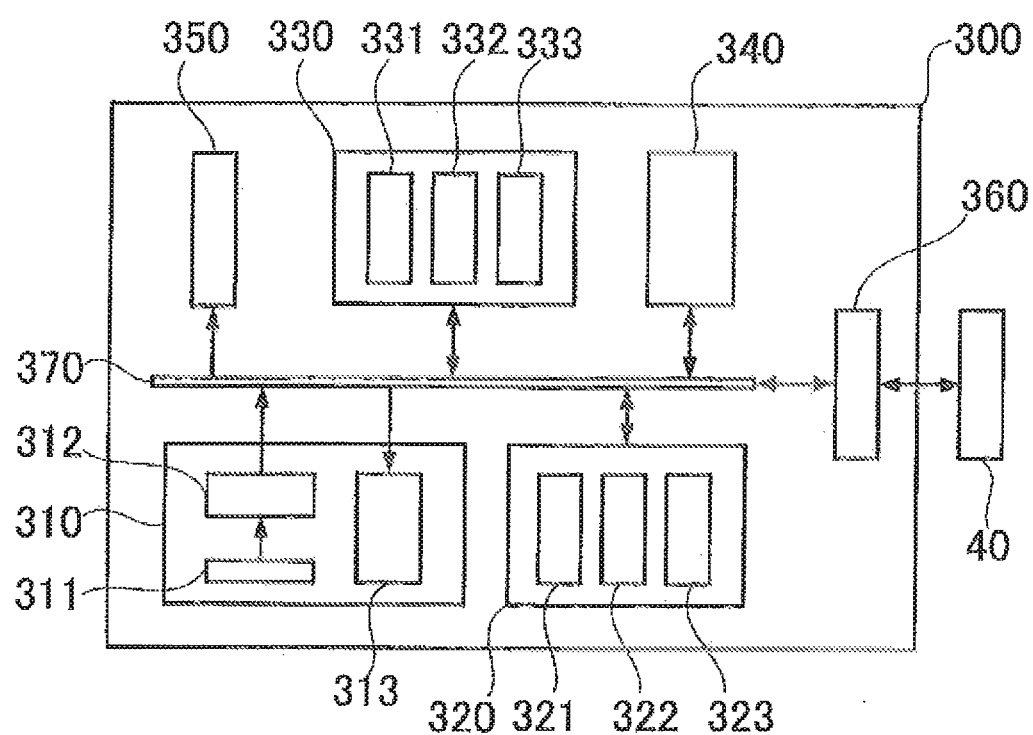
FIG. 27 is a block diagram showing an electrical configuration of the operating device provided with a control panel and a touch sensor type switch.

(3) The operating device may include a touch panel as a control panel, and a touch sensor type switch as an operation element. FIG. 27 is a block diagram showing an electrical configuration of such operating device.

In FIG. 27, an operating device 300 is provided with an operation panel unit 310, an image forming unit 320, a control unit 330, a storage unit 340, an accessory unit 350, a signal receiving and transmitting unit 360, and a bus 370. At least the operation panel unit 310, the image forming unit 320, the control unit 330, the storage unit 340 and the signal receiving and transmitting unit 360 are configured to allow bidirectional exchange of signals via the bus 370. It is sufficient that exchange of information between the accessory unit 350 and the bus 370 is one-way from the bus 37 to the accessory unit 350.

The operation panel unit 310 includes a touch sensor type switch 311, an operation detection unit 370 that detects an operation signal from the touch sensor type switch 311 and sends a signal corresponding to the operation signal to the bus 370, and a display unit 313 that in response to the signal from the bus 370 displays images and other information corresponding to the signal. The display unit 313 is in a form of a touch panel.

The image forming unit 320 includes a signal processing unit 321 that processes the signal received from the bus 370 to image information, a correcting unit 322 that corrects the image information, and, optionally, an image memory 323. The image memory 323 has a function of temporary or long-term storage of the image information, information necessary for processing and correcting the image information received via the bus 370 from a recording unit 340 and/or other information needed to generate the image information in the signal processing unit 321.

The control unit 330 includes an operation control unit 331 that controls the overall operation of the operating device 300, a display control unit 333 that controls display of images and other information on the display unit 313, and a data storage unit 333 that stores information temporarily or over a long period of time necessary for control in the operation control unit 331 and the display control unit 332. The accessory unit 350 is a speaker that emits a sound that appeals to hearing, or a light emitting device that emits light and appeal to vision, etc. The storage unit 340 stores necessary information for each unit constituting the operating device 300.

The signal receiving and transmitting unit 360 performs a two-way exchange of a signal with a drive control device 40 outside the operating device 300. The drive control device 40 constitutes the equipment according to the present invention (other devices constituting the equipment according to the present invention are omitted in FIG. 27).

When the operator operates the switch, an operation signal is sent from the switch 311 which has detected the operation to the operation detection unit 312. A signal corresponding to the operation signal from the operation detection unit 312 which has received the operation signal is sent to the bus 370 and then sent to the operation control unit 331 via the bus 370. After the signal corresponding to the operation signal is received, a signal corresponding to a control signal for the equipment according to the present invention is sent from the operation control unit 331 to the bus 370 and then sent to the drive control device 40 via the signal receiving and transmitting unit 360.

When the operator operates the switch, the display unit 313 displays a part or whole of the accessory unit 350 or an image of an article being conveyed by the accessory unit 350. This image corresponds to the image information formed in the image forming unit 320. When the operator performs operation corresponding to image rotation, expansion and contraction, etc. using the touch panel of the display unit 313, the image is controlled to be rotated, expanded and contracted, etc., in conjunction with the operation, mainly by the display control unit 332.

At the same time, the operation signal is sent to the operation detection unit 312 from the switch 311 which has detected the operation corresponding to rotation, expansion and contraction, etc. of the image that the operator has performed using the touch panel of the display portion 313. A signal corresponding to the operation signal is sent to the bus 370 from the operation detection unit 312 which has received operation signal, and sent to the operation control unit 331 via the bus 370. After the signal corresponding to the operation signal is received, a signal to be sent to the drive control device 40 from the operation control section 331 is sent to the bus 370, and then sent to the drive control device 40 via the signal receiving and transmitting unit 360. Finally, on the equipment side according to the present invention, movement (rotation, expansion and contraction, etc.) of the movable portion or the article to be conveyed by the movable portion corresponding to rotation, expansion and contraction, etc. of the image the operator has performed using the touch panel of the display unit 313 is implemented.

The image information formed in the image forming unit 320 can be controlled by the control unit 330 and sent to the drive control device 40 via the bus 370 and the signal receiving and transmitting unit 360, so as to be also displayed on the display device of the equipment according to the present invention. The image displayed on the display device is the same or substantially the same as the image of part or whole of the accessory unit or the article being conveyed by the accessory unit, displayed on the display portion 313 when the operator operates the switch. Therefore, the operator can intuitively operate movement of the movable portion and conveyance of the article by the movable portion while looking at the display device, without looking at the display unit 313 attached to the operating device 300. Thus, operability is improved. In addition, since people around the operator can understand the operation by the operator directly by viewing the display device, the work site and the surrounding become safer in general.

The invention claimed is:

1. Equipment comprising:
   a mechanism that comprises a movable portion;
   an operating device that comprises a switch, the operating device being configured to detect an operation performed by an operator via the switch;
   a moving mechanism that comprises a motor, the moving mechanism being configured to move the movable portion via the motor;
   a display device that is configured to make a display about movement of the movable portion; and
   a drive control unit that is coupled for signal communication with the moving mechanism and that is coupled for signal communication with the display device and that is configured to control operation of the moving mechanism and the display of the display device based on the operation performed by the operator,
   wherein the drive control unit is further configured to instruct the display device, in response to receiving an instruction of the movement of the movable portion from the operating device, to display a moving direction of the movable portion on the display device, and
   wherein the drive control unit is further configured (i) to confirm the drive control unit having received from the display device a signal indicating that the display device has displayed a moving direction of the movable portion prior to movement of the movable portion and (ii) to thereafter start the movement of the movable portion via the moving mechanism.

2. The equipment according to claim 1, wherein the drive control unit is further configured to delay, for at least a predetermined time, issuance of a command to execute the movement to the moving mechanism, after the drive control unit confirms the drive control unit having received the signal from the display device before starting the movement.

* * * * *